(12) United States Patent
Williams

(10) Patent No.: US 6,877,236 B1
(45) Date of Patent: Apr. 12, 2005

(54) OPTICAL MEASURING DEVICE SYSTEM AND METHOD

(76) Inventor: Craig Edward Williams, 6210 Wheatfield Dr., Harrison, TN (US) 37341

(*) Notice: Subject to any disclaimer, the term of this patent is extended or adjusted under 35 U.S.C. 154(b) by 0 days.

(21) Appl. No.: 10/413,340

(22) Filed: Apr. 14, 2003

(51) Int. Cl.[7] .................. G01C 15/00; G01C 3/00
(52) U.S. Cl. ................ 33/286; 33/DIG. 21; 33/276; 33/279
(58) Field of Search ............... 33/227, 455, 276–280, 33/286, 264, DIG. 21, 558.01, 558.02

(56) References Cited

U.S. PATENT DOCUMENTS

| | | | | |
|---|---|---|---|---|
| 1,288,713 A | * | 12/1918 | Simanik | 33/279 |
| 1,696,832 A | * | 12/1928 | Bane | 33/664 |
| 1,779,818 A | * | 10/1930 | Longyear | 33/279 |
| 2,330,414 A | * | 9/1943 | Elwert | 33/277 |
| 4,742,618 A | | 5/1988 | Watkins et al. | |
| 4,889,425 A | * | 12/1989 | Edwards et al. | 33/286 |
| 5,046,259 A | | 9/1991 | Tusting | |
| 5,784,792 A | | 7/1998 | Smith | |
| 5,864,956 A | | 2/1999 | Dong | |
| 5,872,657 A | | 2/1999 | Rando | |
| 5,983,510 A | | 11/1999 | Wu et al. | |
| 6,065,217 A | | 5/2000 | Dong | |
| 6,073,353 A | | 6/2000 | Ohtomo et al. | |
| 6,347,457 B1 | * | 2/2002 | Espinoza et al. | 33/288 |
| 6,360,446 B1 | | 3/2002 | Bijawat et al. | |
| 6,442,856 B1 | * | 9/2002 | Warner | 33/478 |
| 6,449,855 B1 | | 9/2002 | Louis | |
| 6,453,568 B1 | | 9/2002 | Hymer | |
| 6,560,560 B1 | * | 5/2003 | Tachner | 702/164 |
| 6,583,869 B1 | * | 6/2003 | Sheridan | 356/153 |

* cited by examiner

*Primary Examiner*—Christopher W. Fulton
*Assistant Examiner*—Yaritza Guadalupe

(57) ABSTRACT

The present invention relates to an optical measuring devices and method of using the device. The optical measuring device utilizes a plurality of lasers attached to a plurality of interconnected legs to optically determine CENTER, LEVEL, LENGTH, DISTANCE, and PLUMB related to a measured object. In an exemplary embodiment, a user can sight reference laser beams at a first and second point on an object. A mechanical interrelationship between the interconnected legs of the device orientates a laser beam emitted from the center laser at a point, which is equidistance between the reference laser beams. The optical measuring device can include a level, a distance finding attachment, and or an electronic system 500. Electronic system 500 functionality can include, but is not limited to, data processing, data communications, GPS enabled applications, user interface, and distance and angle determination interfaces. The optical measuring device is preferably compact, pocket sized, and portable.

20 Claims, 18 Drawing Sheets

100

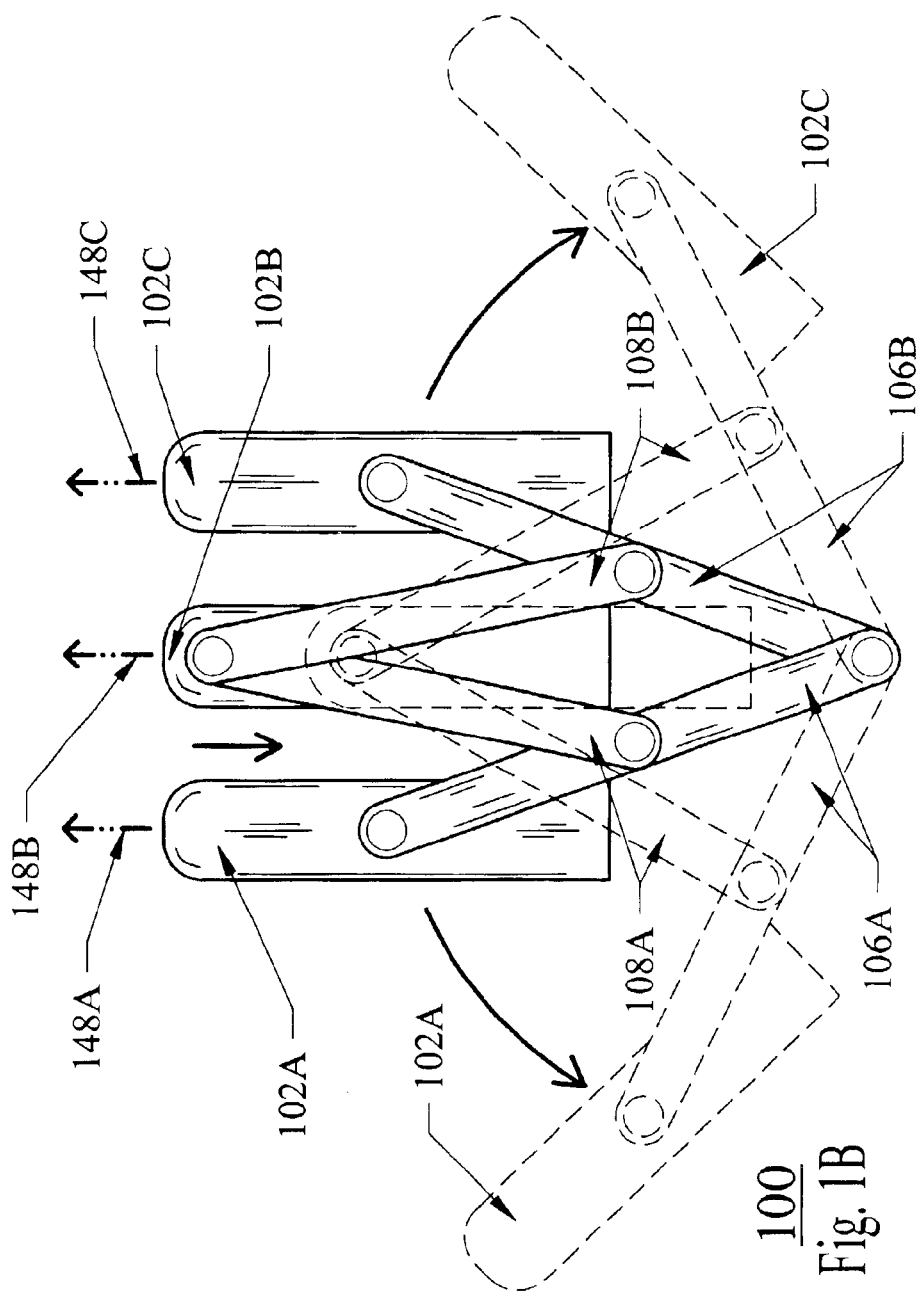

100

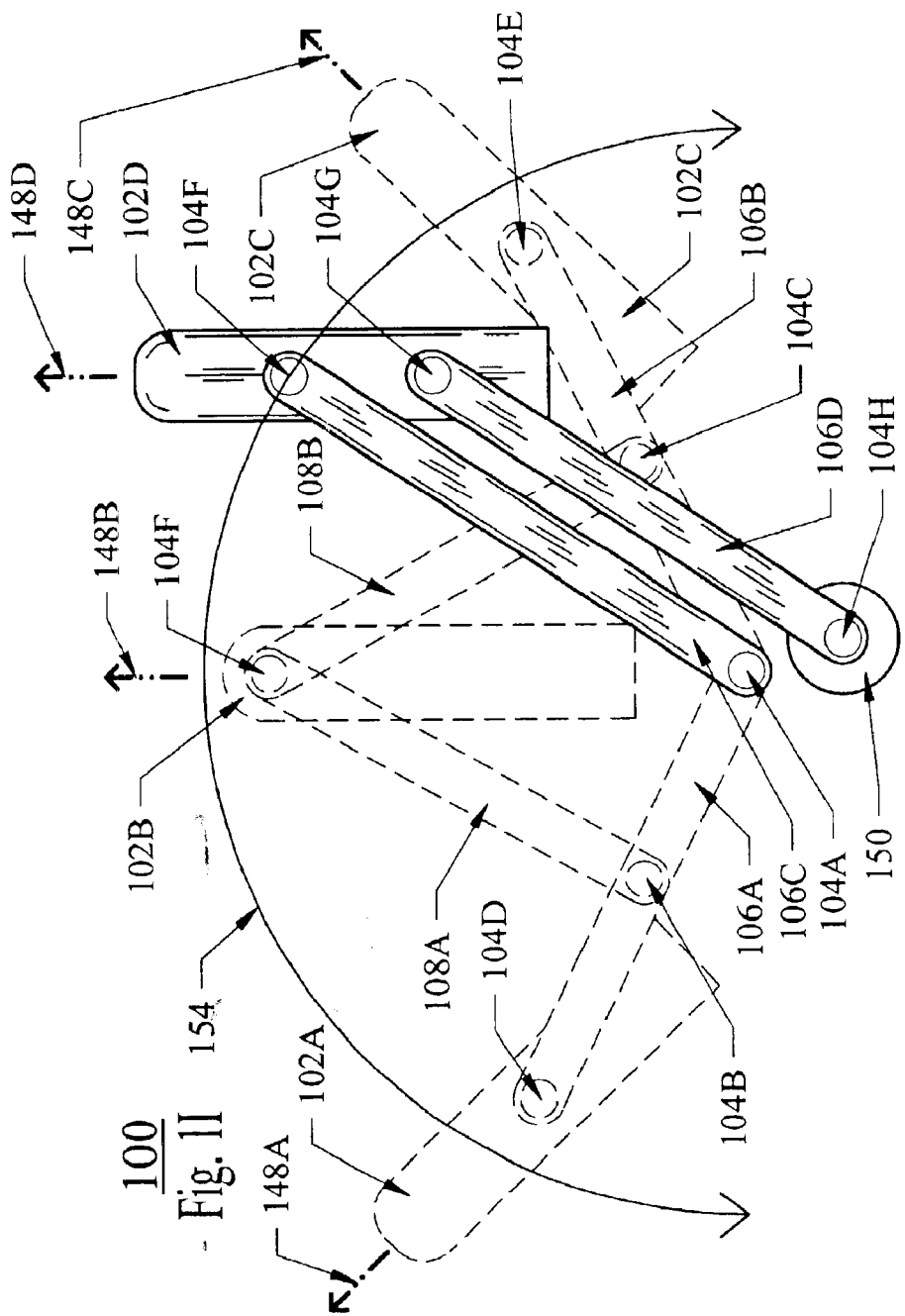

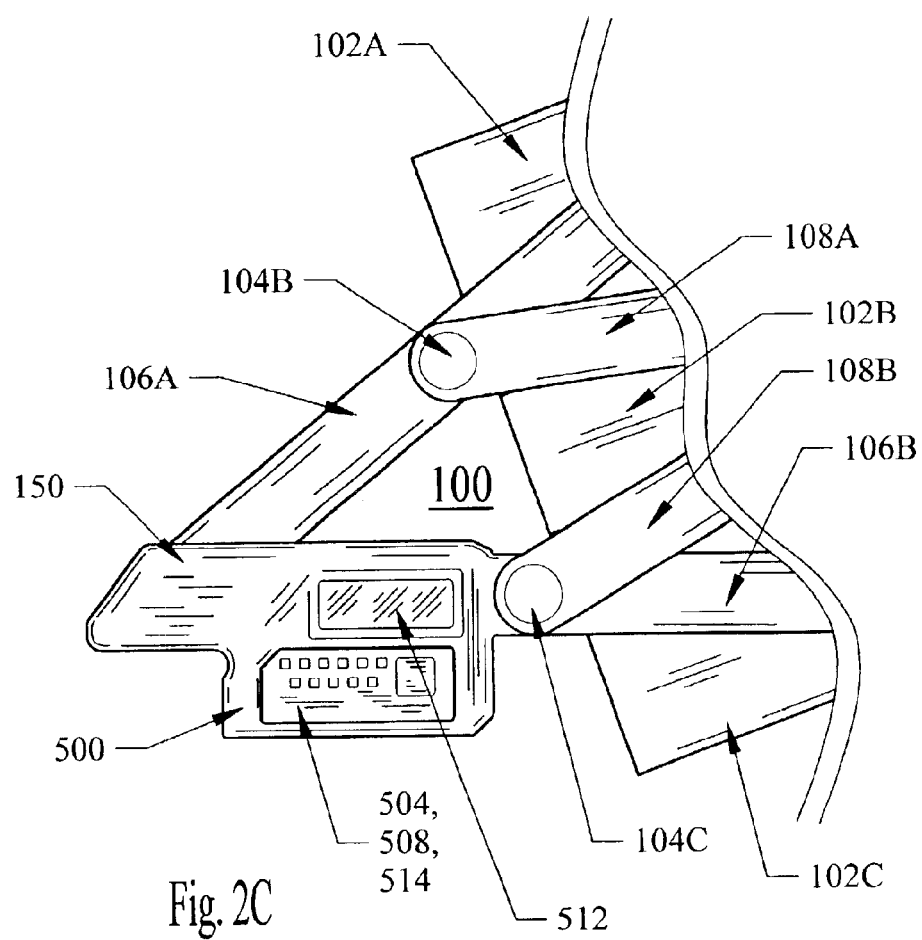

500

500

2000

OPTICAL MEASURING DEVICE SYSTEM AND METHOD

TECHNICAL FIELD OF THE INVENTION

The present invention relates to an optical measuring devices and method of using the device. The optical measuring device can utilize a plurality of lasers attached to a plurality of interconnected legs to optically determine CENTER, LEVEL, LENGTH, DISTANCE, and PLUMB as related to the measurement of a plurality of objects. The optical measuring device can include a level, a distance finding attachment, and or an electronic system 500. Electronic system 500 functionality can include, but is not limited to, data processing, data communications, global positioning system (GPS) enabled applications, user interface and inputs, and or distance and angle determination devices and interfaces. The optical measuring device is preferably compact, pocket sized, and portable.

BACKGROUND OF THE INVENTION

Lasers have been used as an aid in the construction industry for quite some time. Examples can include the determination and marking of straight lines on construction surfaces. In this regard, known points can be measured and marked. A laser can then be used to shine a laser beam between the points to strike a straight line. In addition, laser devices equipped with a level can be utilized to determine and strike straight lines, which are also level.

Other applications of lasers have included finding level edges in a room for setting up and or installing suspended ceilings. In this regard, an apparatus having a laser attached to it can be suspended from the ceiling at the desired ceiling height. The laser is allowed to rotate such that the laser beam is projected on wall surfaces and ceiling edges to be used as a guide during the construction and or installation of the ceiling.

Currently, finding a center point between to points typically involves a series of measurements with a tape measure, a string and or mathematical calculations to determine the location of the center point. As such, lasers used in construction to find straight lines and lasers used to find level edges for suspended ceilings are of no help in determining the center point between reference points. Furthermore, determination of distances between reference points, and lengths of certain objects are at present best made with a tape measure and or string.

The tape measure or a string may be suitable for measuring and or determining center, distances, and length of an object when the object is easily accessible or relatively short in length. However, trying to make such measurements on large objects, such as for example, the side of a house, the roof of a building, a concrete driveway, a sidewalk, a pool, walls, a room, a ceiling, and or other objects can be troublesome. Such objects, that may be large, difficult to reach, difficult access, or are in environments that don't lend themselves well to physical access, or tape measure and string type measurements can be tough if not impossible to measure.

For example finding the center of a room can require at least two people, a tape measure, and or other measurement devices. In addition, several measurements will most likely need to be made to ensure the proper location has been identified. Such identification can be extremely important when, for example, locating the center of the room for the hanging of a ceiling fan is required.

Equally as difficult can be finding the center of, for example, a fence or other large or long object. In the case of a fence, the fence can be of such length that a single tape measure having a maximum tape length that is much shorter than the total length of the fence. As a result, measuring the fence now necessitates the making of numerous incremental measurements in ordered ascertain first the total length of the fence and then further incremental measurements in order to determine where the center of the fence is located.

As such, current methods for identifying the center, distance, length, or plumb of an object may require several measurements, require the use of a variety of measuring devices, and or require calculations to be performed to produce a result, all of which can be prone to errors and or be cumbersome to effectuate.

Furthermore, current methods for locating the center, distance, length, or plumb of an object are not practical or feasible when it comes to measuring objects that are large or that may be difficult to reach, inaccessible, and or provide no means to otherwise identify the point or dimension of interest.

There is a long felt need for a measuring device that can be used to quickly determine the center, distance, length, and plumb of objects ranging in size from big to small, and of objects that may or may not be conveniently accessible which in part gives rise to the following invention.

SUMMARY OF THE INVENTION

The present invention relates to an optical measuring devices and method of using the device. The optical measuring device utilizes a plurality of lasers attached to a plurality of interconnected legs to optically determine a CENTER point between at least two reference laser beams.

The present invention also relates to an optical measuring device and method for utilizing the optical measuring device with a built-in level in such a way as to determine a CENTER point between at least two reference laser beams and selectively a CENTER point, which is LEVEL with respect to the reference points. Furthermore, the optical measuring device can be used as a PLUMB BOB.

The present invention also relates to an optical measuring device having a plurality of interchangeable projection heads such that the emitted laser beam from the plurality of lasers can be displayed in patterns, such patterns can include dots, lines, a plurality of lines, cross hair, and dot matrix.

The present invention also relates to an optical measuring device that utilizes a single action alignment leg to allow a user to align at least two reference point lasers with a single push or pull motion.

The present invention also relates to an optical measuring device and method of using the device, wherein the optical measuring device includes a distance finding attachment. The distance finding attachment can be used to determine certain LENGTHS and or DISTANCES by utilization of a laser, angular determination device, and or angular determination interface. In this regard, the distance finding attachment can be rotated through an arc 154 in such a manner as to allow a distance finding laser beam to intersect with the plurality of optical measuring device lasers. An angular determination device and or angular determination interface can be utilized to effectuate input resultant from the use of the distance finding attachment including calculations related to the measured object.

The present invention also relates to an optical measuring device having indicia inscribed on the plurality of legs. In addition, the plurality of legs further have an extension portion on which indicia can be inscribed thereon. In this regard, the angle formed by the intersection of the device legs can be visually determined by inspection of the optical measuring device legs.

The present invention also relates to an optical measuring device having an electronic system for performing measurements, calculations, data processing, data communication, data storing, and or other functions.

The present invention also relates to an optical measuring device having an electronic system, which optionally can encompass at least one angle portion of the optical measuring device. Such angle portion can be formed by the intersection of the plurality of legs. In this regard, the electronic system can monitor the motion and determine the angles between at least two legs of the optical measuring device. Furthermore, such monitoring can be used in calculations, data processing, data communication, data storing, and or other functions related to the use and accuracy of use of the optical measuring device.

The present invention also relates to an optical measuring device having a data communication interface for data communicating to other data processing devices via wired or wireless interfaces including local area network (LAN), wide area network (WAN), and or data communications over a global network with a plurality of global network based data processing resources.

The present invention also relates to an optical measuring device having an electronic system with an activation interface such that a user can activate the optical measuring device by way of manual push button, opening and or closing of the optical measuring device, and or detection of the optical measuring device leg motion.

The present invention also relates to an optical measuring device having a GPS interface for associating global positioning system data with locations where measurements with the optical measuring device are being performed.

The present invention also relates to an optical measuring device that is preferably compact, pocket sized, and portable.

BRIEF DESCRIPTION OF FIGURES

The present invention is best understood from the following detailed description when read in connection with the accompanying drawings. Included in the drawings are the following Figures:

FIG. 1B there is shown an optical measuring device 100 in a closed and open position;

FIG. 1I there is shown an optical measuring device 100 having a distance measurement attachment leg and laser;

FIG. 2C there is shown an optical measuring device 100 having an electronic system 500 with an angular measurement device incorporated thereon;

DETAILED DESCRIPTION OF THE INVENTION

Figure 1A:
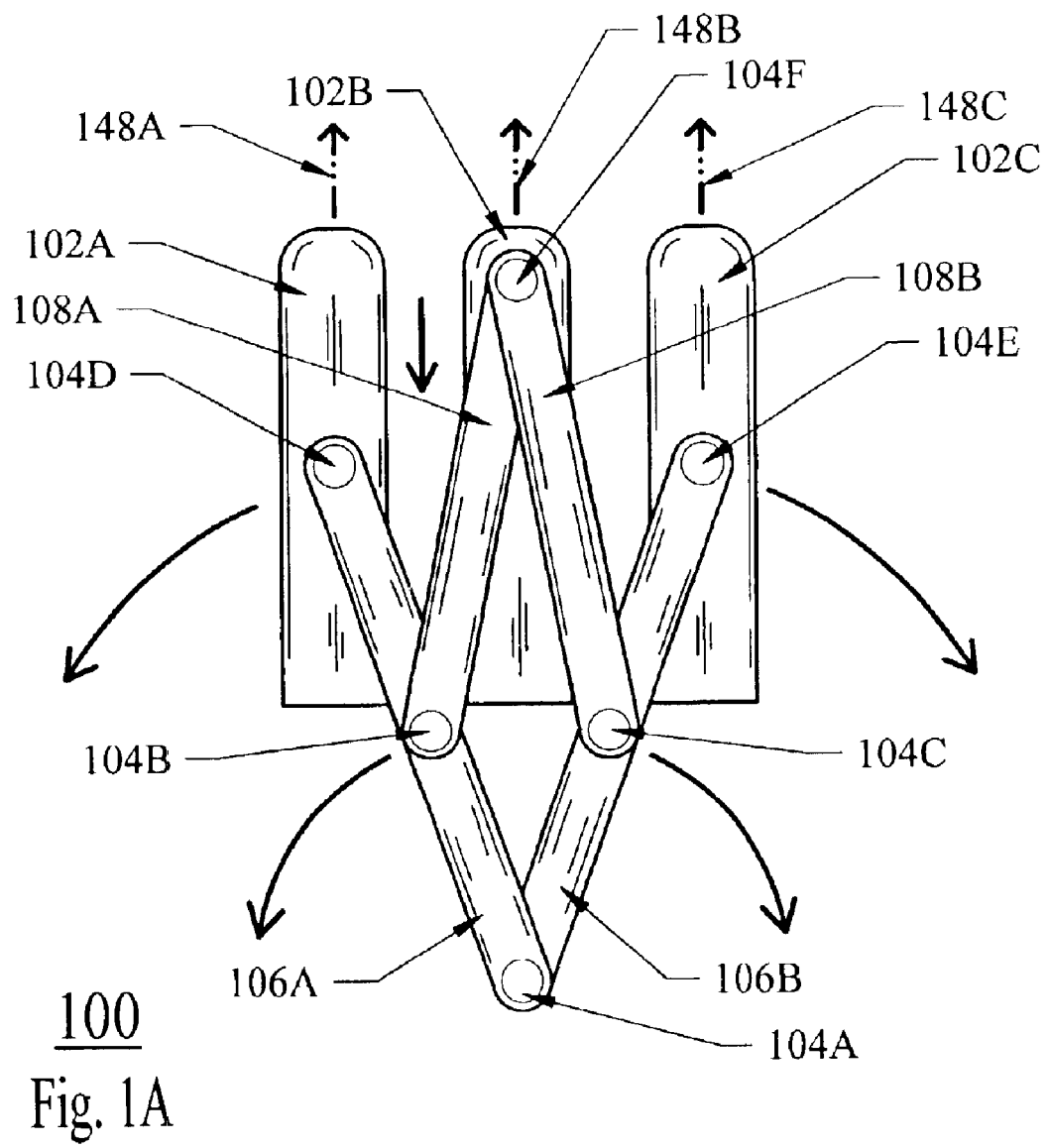
FIG. 1A there is shown an optical measuring device 100 in a closed position.

Referring to FIG. 1A there is shown an optical measuring device 100 in a closed position. In an exemplary embodiment, a plurality of legs 106 and 108 can be interconnected with one another and with a plurality of lasers 102. Such an optical measuring device can be utilized to determine the CENTER of an object, points that are LEVEL on an object, certain DISTANCES and or LENGTHS related to the object, and or the PLUMBNESS (vertical orientations and or perpendicular orientations). An object can be anything including, for example and not limitation, a door, a wall, a ceiling, a floor, a deck, a pool, a yard, a piece of wood, a pipe, a side of a house, etc.

Referring to FIG. 1A there is shown a plurality of lasers 102A, 102B, and 102C. FIG. 1A shows laser 102A interconnected with leg 106A. Laser 102C is shown interconnected with leg 106B. Leg 106A and 106B are interconnected together and hinged by pin 104A. In this regard, the distance between lasers 102A and 102B is adjustable and the lasers 102A, 102B, and 102C are moveable in coordination with one another. Laser 102B is shown connected by pins 104F to the end of legs 108A and 108B. Legs 108A and 108B, on their opposite ends, are connected by pins 104B and 104C to legs 106A and 106B respectively. Lasers 102A and 102C can be referred to as reference point lasers, in that, lasers 102A and 102C can be utilized to illuminate and or mark reference points by which laser 102B will illuminate the CENTER point between.

In an exemplary embodiment, for example and not limitation, a user can separate the reference point lasers 102A and 102C in such a way as to sight the laser beam 148A from laser 102A at one end of, or reference point on, the object and the laser beam 148C from laser 102C at the opposite end of or reference point on the object. Through the interconnection of legs 106A and 106B and legs 108A and 108B with laser 102B, laser 102B is mechanically, in a scissor type action, orientated in such a way as to allow the laser beam 148B from laser 102B to be projected at the CENTER equidistance between the reference point laser beams on the object being measured.

In other words, in exemplary embodiment for example and not limitation, a user of the optical measuring device 100 can find the CENTER of an object by; activating the device causing the plurality of laser beams 148 to be emitted from the plurality of lasers 102; orientating and or sighting the laser beam 148A emitted from laser 102A at one edge of the object or at a point on an object; orientating and or sighting the laser beam 148C emitted from laser 102C at a second edge of the object or at a point on an object; and locating the CENTER point equidistance between the reference laser beams projected on to the object.

During the orientation and sighting of lasers 102A and 102C, laser 102B is moved into a position by the mechanical interconnection and motion of the plurality of legs 106 and 108. More specifically, the interaction of the plurality of legs 106A, 106B, 108A, and 108B mechanically position the center laser 102B—allowing the center laser 102B to illuminate a CENTER point equidistance between the two reference laser beams 148A, and 148C projected on to the object being measured.

Lasers 102A, 102B, 102C, and 102D (laser 102D is shown in FIG. 1I) can be referred to as a plurality of lasers 102. In addition, the plurality of lasers 102 can be referred to as a plurality of optical components 506 or can be a component or subassembly of the plurality of optical components 506. A plurality of legs 106A, 106B, 106C, 106D (106C and 106D are shown in FIG. 1I) can be referred to as a plurality of legs 106. Legs 108A, 108B can be referred to as a plurality of legs 108. Laser beams 148A, 148B, 148C, and 148D (laser beam 148D is shown in FIG. 1I) can be referred to as laser beams 148 or a plurality of laser beams 148. Pins 104A–F can be referred to as a plurality of pins 104, or pins 104.

An advantage in using the optical measuring device 100 is that large objects, small objects, and object that may be inaccessible or unreachable can easily be measured and the CENTER between points marked by the reference point lasers 102A and 102B can quickly be determined. In addition, measurements of objects from a distance, objects in the dark, objects in dangerous environments, as well as measurements of numerous other difficult to access objects and or objects in dangerous places or environments can easily be performed.

For example and not limitation, positioning of a ceiling fan in the middle of a ceiling can require many measurements by hand and or tape measure in order to determine precisely where the CENTER of the room is located and thus a desirable location for the ceiling fan. Using the optical measuring device 100 the CENTER of the room and thus a desirable location for the ceiling fan can easily be determined by positioning the reference point laser beam 148A emitted from laser 102A at one corner of room and the reference point laser beam 148C emitted from laser 102C at the other corner of the room. With the reference point lasers 102A and 102C positioned, laser beam 148B emitted from laser 102B illuminates the midpoint between lasers 102A and 102C and thus the CENTER of the object being measured. In this example, the CENTER of the ceiling and as such a desirable location for the ceiling fan.

The plurality of legs 106 and 108 can be fabricated from metal, plastic, polymer, or other suitable or similar materials. In addition, the plurality of legs 106 and 108 can be manufactured from an extruded plastic, punched from a suitable material, and or be fabricated from other types of suitable and or similar materials, and manufacturing methods.

In addition, the optical measuring device 100 can be manufactured such that the device 100 is preferably compact, pocket sized, and portable. In this regard, the length of the plurality of legs can be preferable as short as a couple of inches. The optical range of the plurality of lasers can preferably be in the range of 1500 feet or less, wherein the optical range of the device is limited more so by the selection of the laser type and laser power then the device 100 construction. The optical measuring device 100 can also be tripod mountable to eliminate the need for a user to hold the device, and to improve accuracy by steadying the device.

In an alternative embodiment, the selection of the length of the legs, laser type and laser power and ultimately the performance of the optical measuring device 100 can be selected based on the objectives of the measurements to be made including consideration of the object to be measured, and the environmental condition under which such measurements are to be made.

The plurality of lasers 102 can include lasers commonly used for pointing devices, helium neon type of lasers, red, green, violet, blue, near infrared (NIR) types or kinds of lasers, diode lasers, diode pumped lasers, and or other similar, suitable, or desired types and or kinds of lasers.

The plurality of pins 104 can include metal, plastic, rivets, or other similar and or suitable materials, which can serve to fasten the legs and or the lasers together. In this regard, the fastening of the plurality of legs 106 and 108 and lasers 102 can be accomplished in such a way as to enable the plurality legs 106 and 108 to pivot around the plurality of pins 104 allowing the plurality of laser beams 148 emitted from the plurality of lasers 102 to be moved, sighted, aligned, or otherwise be positioned as necessary to effectuate the desired measurements.

FIG. 1A also illustrates the laser beam direction by arrows while in the CLOSED position. The optical measuring device 100 laser beams 148, can also be referred to as laser beam 148A, 148B, and 148C. In addition, FIG. 1A illustrates the relative motion of the device 100 when OPENED from the CLOSED position with arrows indicating how the reference point lasers 102A and 102C separate, and the relative motion of laser 102B as the interconnected plurality of legs 106 and 108 mechanically manage and effectuate the motion in the positioning of each of the plurality of lasers 102.

Referring to FIG. 1B there is shown an optical measuring device 100 as its orientation changes from the CLOSED position to a more OPEN position. In this regard, as a user separates the plurality of lasers 102 the interconnected plurality of legs 106 and 108 reposition the center laser, laser 102B. Referring to FIG. 1B the optical measuring device 100 is shown in a CLOSED position by solid lines and in the more OPENED position with dashed lines.

Figure 1C:
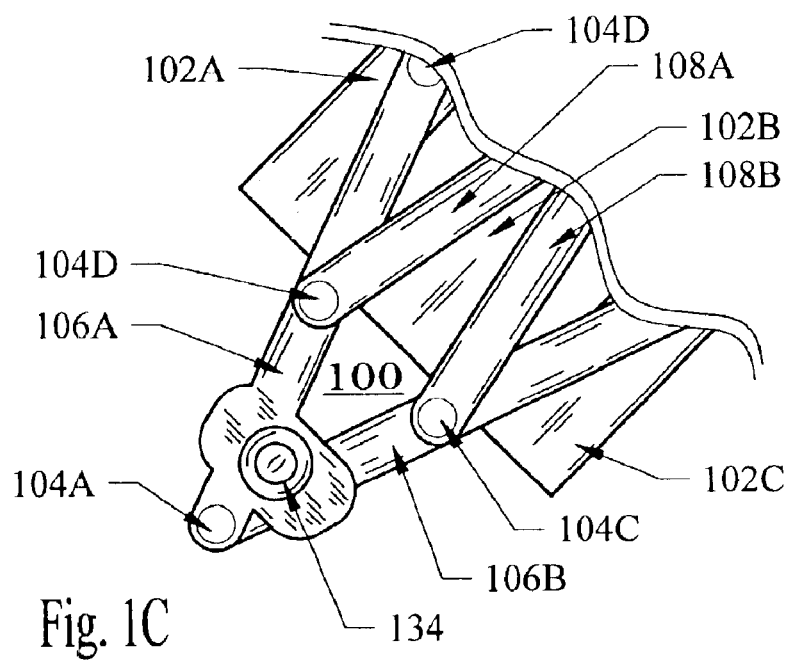
FIG. 1C there is shown an optical measuring device 100 with a bubble level.

Referring to FIG. 1C there is shown an optical measuring device 100 with a bubble level 134. In an exemplary embodiment, the optical measuring device 100 can be utilized to determine if a plurality of objects and or reference points are LEVEL. In this regard, the optical measuring device 100 can be used in such a way that laser beams emitted from laser 102A and laser 102C are first positioned at opposite edges of the object and or at desired reference points on the object. The optical measuring device 100 can then be brought LEVEL by using the bubble level 134. Once the optical measuring device 100 is LEVEL, the laser beam 148B emitted from laser 102B now identifies not only a CENTER point equidistance between the reference point laser beams 148A and 148C but in combination with the bubble level 134 (or tube level 136, and or electronic system 500 level shown in other Figures) also identifies that the CENTER point is LEVEL with respect to the reference point laser beams.

For example and not limitation, a user of the optical measuring device 100 can activate the device; position the laser beams 148A and 148C emitted from lasers 102A and 102C respectively at desired edges of an object and or at desired reference points on the object; LEVEL the device 100 using the bubble level 134 (or tube level 136, and or electronic system 500 level shown in other Figures) and mark the point illuminated by laser beam 148B emitted from laser 102B as the CENTER point which is LEVEL with respect to the reference points illuminated by lasers 102A and 102C.

If for example and not limitation, a user were trying to hang a picture on a wall which was to be CENTERED and LEVEL between two bookshelves the user of the optical device 100 could; first position the laser beams 148A and 148C emitted from lasers 102A and 102C respectively on known level positions, such as the top of each bookshelf or on one of the shelves within each bookshelf; level the optical measuring device 100 by raising or lowering the end of the optical measuring device 100 having the bubble level 134 (or tube level 136, and or electronic system 500 level shown in other Figures) such that the air bubble within the level or the electronic system 500 indicates that the optical measuring device 100 is LEVEL; and mark the spot illuminated by the laser beam 102B emitted from laser 102B as CENTERED and LEVEL with respect to the reference point laser beams 148A and 148C.

In an exemplary embodiment, the bubble level 134 can be utilized as a multi-axis LEVEL in that the air bubble when positioned in the center of the level indicates that not only the left and the right lasers are level with respect to each other, but that the optical measuring device 100 is also level from front to back insuring that the projected laser beams 148 are properly illuminating points that are both CENTERED and LEVEL with respect to the other laser beams 148.

Figure 1D:
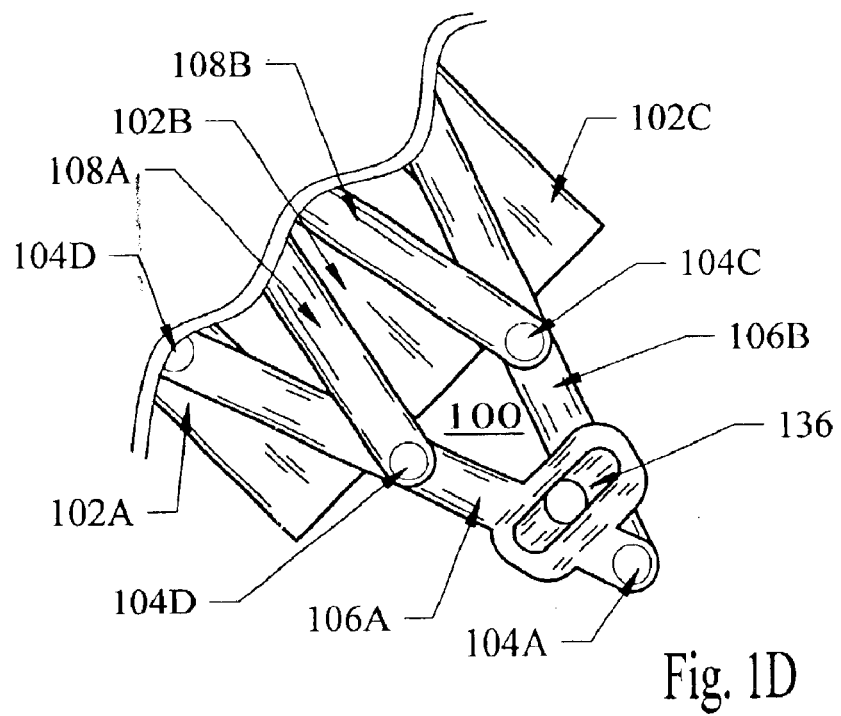
FIG. 1D there is shown an optical measuring device 100 with a tube level.

Referring to FIG. 1D there is shown an optical measuring device 100 with a tube level 136. In this embodiment the tube level 136 provides a single axis in which to LEVEL the device. In this embodiment, positioning the device from left to right or from front to back would be possible depending on the orientation of the tube level 136. In an exemplary embodiment, two tube levels 136 can be used. In a two tube level 136 configuration one of the tube levels 136 can be orientated is such a way as to allow leveling the device 100 from side to side; and the other tube level 136 can be orientated is such a way as to allow leveling the device 100 from front to back. This orientation utilizing two tube levels 136 can provide multi-axis leveling of the device 100.

Figure 1E:
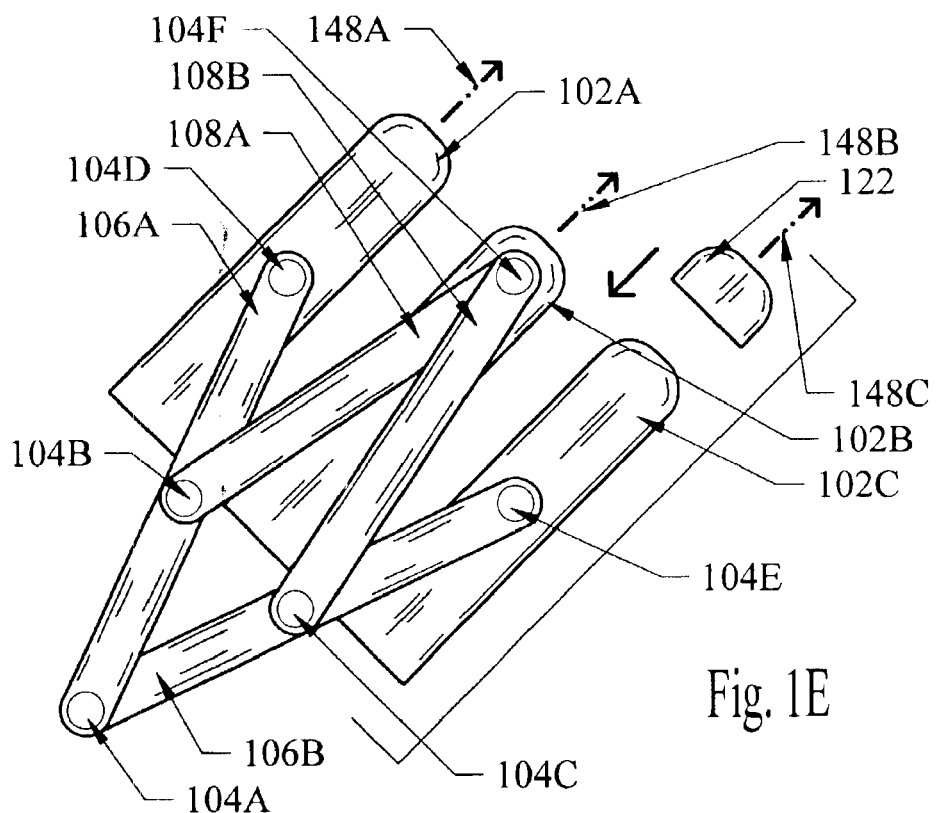
FIG. 1E there is shown an optical measuring device 100 with an interchangeable projection head.

Referring to FIG. 1E there is shown an optical measuring device 100 with interchangeable projection heads 122. In an exemplary embodiment, a user of the optical measuring device 100 can change the appearance of the projected laser beams 148. In this regard, laser beams 148 can be changed into patterns, which may make measurements easier to make, more desirable to view, more accurate, and or for other reasons. In this regard, an interchangeable projection head 122 can be added to anyone of the plurality of lasers 102. In applying the projection head 122 over the optical portion of the laser 102 the laser beam 148 is disbursed and or changed into known patterns.

Figure 1F:
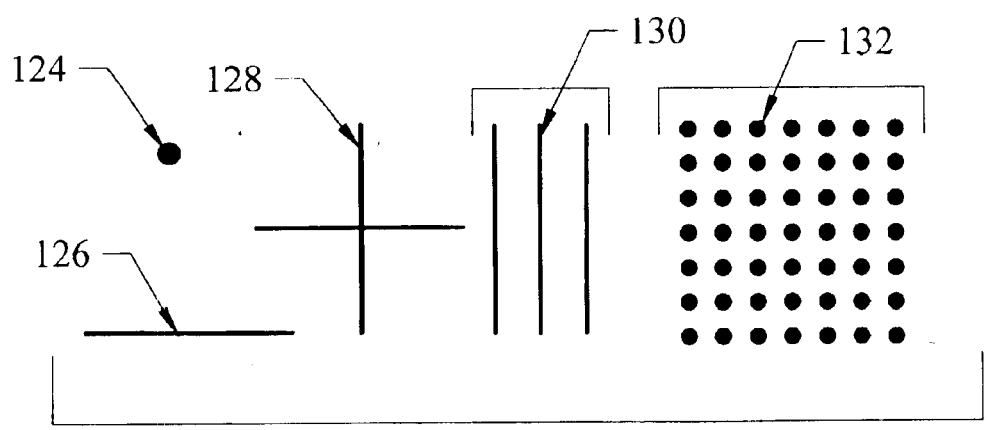
FIG. 1F there is shown a series of laser beam interchangeable projection head patterns.

FIG. 1F illustrates possible laser beam 148 patterns using interchangeable projection heads 122. Such laser beam 148 patterns can include dots such as dot 124, lines such as line 126, cross hair such as cross hair 128, a plurality of lines such as a plurality of lines 130, and or a plurality of dots such as dot pattern 132 also referred to as dot matrix 132. Interchange projection heads 122 can include other similar, suitable, desired, and or required patterns.

An advantage of using the interchangeable projection head 122 with the optical measuring device 100 can be that a line 126, cross hair 128, plurality of lines 130 and or a plurality of dots 132 can be displayed on the object making measurements more accurate or easier to see at greater distances and or during various ambient dark and ambient light conditions.

Figure 1G:
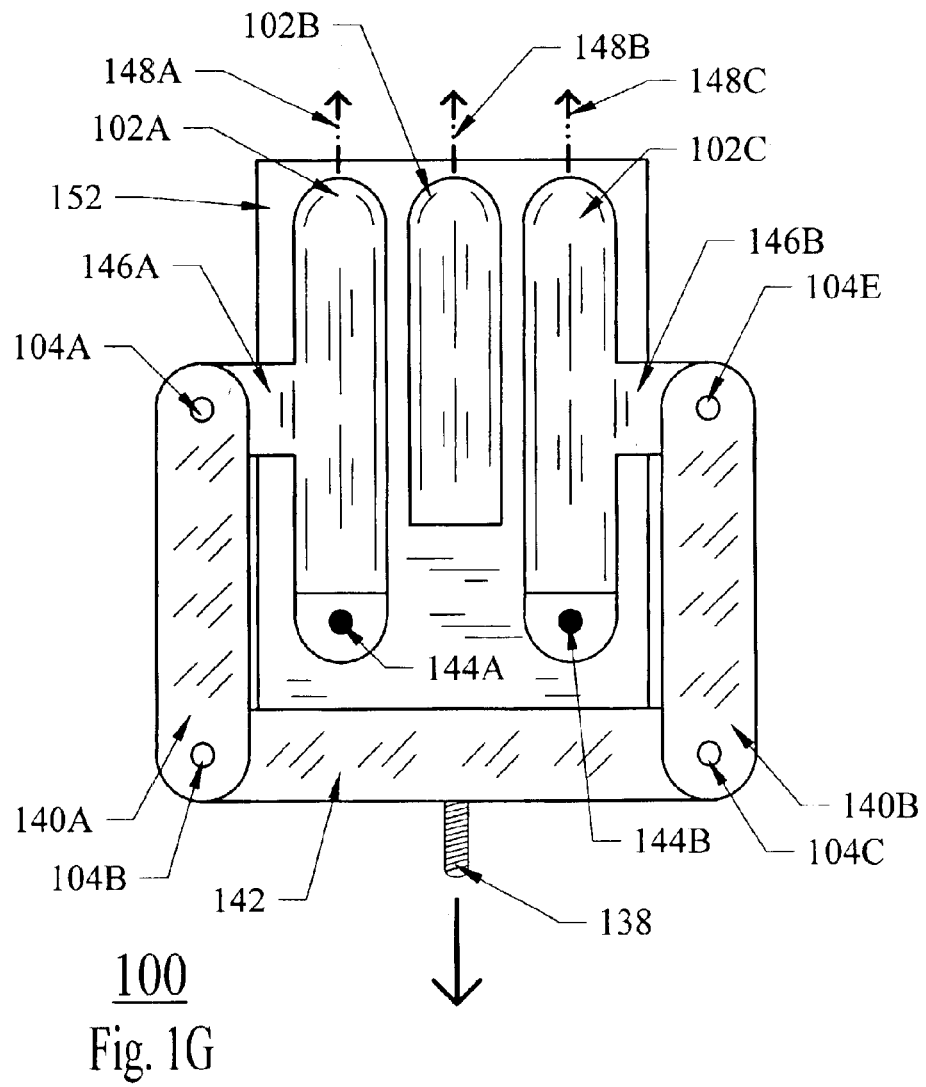
FIG. 1G there is shown an optical measuring device 100 having a single action alignment leg in a closed position.

Referring to FIG. 1G there is shown an alternative embodiment of the optical measuring device 100. An advantage of this embodiment is that a single action alignment leg, such as single action alignment leg 142 can be utilized to align the reference point laser beams 148A and 148C and identify the CENTER location and or LEVEL points of an object as may be required and or desired by the user with a single push or pull motion on the single action alignment leg 142.

In an exemplary embodiment a user can push or pull peg 138 moving the single action alignment leg 142 forward or backwards. Peg 138 is attached to the single action alignment leg 142. As the single action alignment leg 142 moves forward the laser beams are pushed by legs 140A and 140B to the CLOSED position. Legs 140A and 140B can be referred to as a plurality of legs 140 and are similar in manufacture as the plurality of legs 106 and the plurality of legs 108.

Figure 1H:
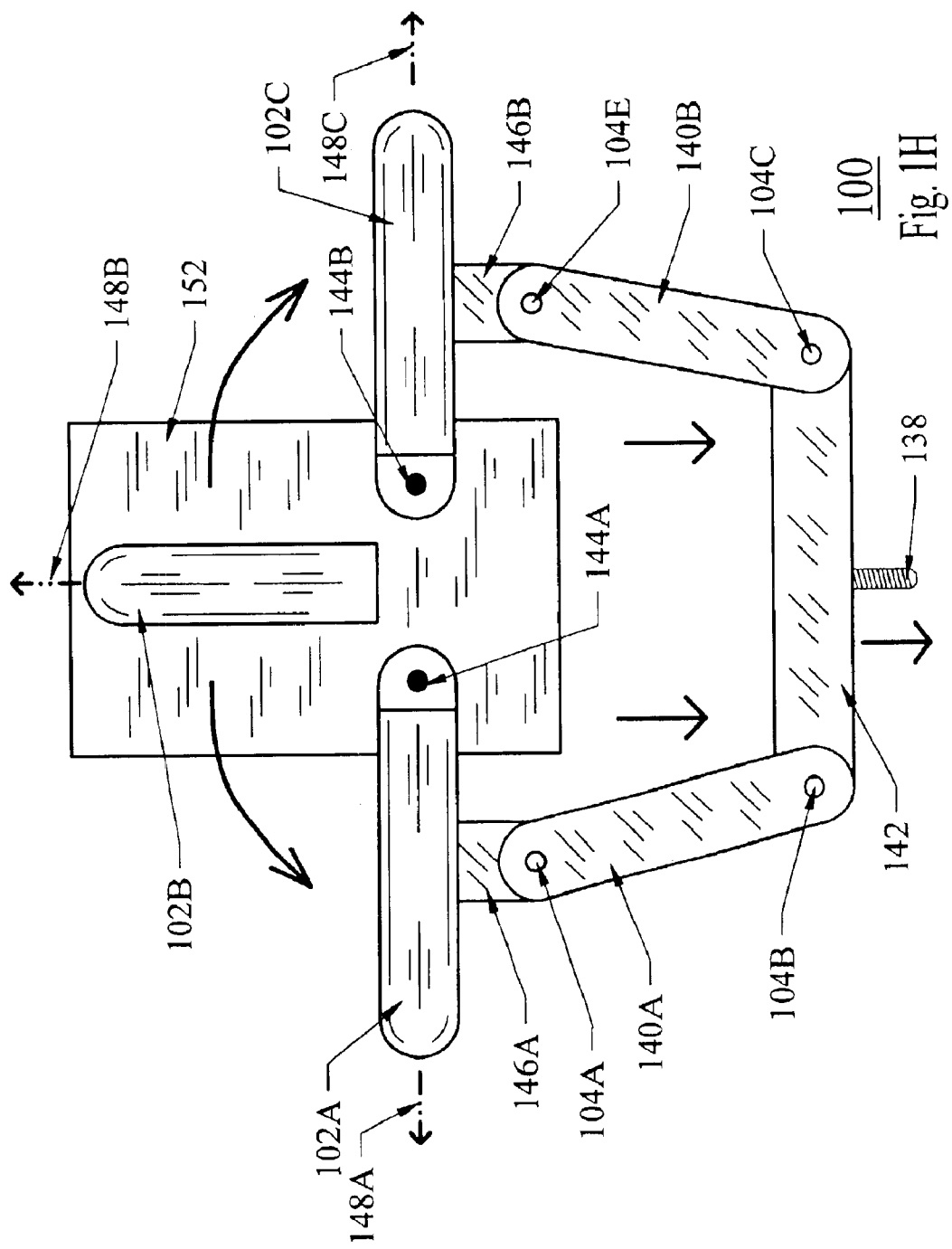
FIG. 1H there is shown an optical measuring device 100 having a single action alignment leg in an open position.

The CLOSED position is shown in FIG. 1G. By pulling peg 138 backwards the reference point laser beams 148A and 148C and associated lasers 102A and 102C respectively pivot around pins 144A and 144B. FIG. 1H shows the optical measuring device 100 in a more OPEN position where the single action alignment leg 142 has been moved to a back point. Pins 144A and 144B can also be referred to as pivot pins 144 and or pins 144.

For example and not limitation, if a user desires to use the embodiment of the optical measuring device 100 shown in FIGS. 1G and 1H, the user could perform the following; activate the device causing the laser beams 148 to be emitted from the plurality of lasers 102; move peg 138 and the attached single action alignment leg 142 to a position where the laser beams 148A and 148C emitted from lasers 102A and 102C are at the desired edges of an object to be measured and or point to desired reference points on the object; and mark the position illuminated by laser beam 148B being emitted from laser 102B as the CENTER point equidistance between the reference points laser beams 148A and 148C.

In another exemplary embodiment, the optical measuring device 100 shown in FIGS. 1G and 1H can also incorporate the bubble 134 level, tube level 136, an electronic system 500, distance finding attachment, and or other similar or suitable elements or devices as may be required or desired to make the desired measurements of CENTER, LEVEL, LENGTH, DISTANCE, and or PLUMB.

FIGS. 1G and 1H show how lasers 102A and 102B can include pivot pins 144A and 144B which can be attached to the enclosure surface 152. In this embodiment the application of force by a user to the single action alignment leg 142 can cause lasers 102A and 102B to pivot on pivot pin 144A and pin 144B. In this regard, laser 102B, pins 144A and 144B can be fastened to the enclosure surface 152, in such a way that laser 102B and pivot pins 144A and 144B remain stationary while the single action alignment leg 142 is pushed or pulled.

In operation, the motion of moving the single action alignment leg 142 by way of peg 138 causes legs 140A and 140B to apply force and move the laser attachment legs 146A and 146B causing lasers 102A and 102C to move between the OPEN and CLOSED positions. Using peg 138 a user can align the laser beams 148A and 148C emitted from lasers 102A and 102C on a desired object causing the laser beam 148B emitted from laser 102B to be cast upon the CENTER and or CENTER and LEVEL point equidistance between reference point laser beams 148A and 148C on the measured object.

Referring to FIG. 1I there is shown an optical measuring device 100 with a distance finding attachment. In an exemplary embodiment, a distance finding attachment can be used in conjunction with the optical measuring device 100 to determine the LENGTH and or DISTANCE related to the object being measured.

Shown in FIG. 1I is the optical measuring device 100 with a distance finding attachment. The distance finding attachment includes leg 106C, leg 106D and laser 102D being interconnected with leg 106C and leg 106D. Legs 106C and 106D are attached to the laser 102D in such a way as to cause laser 102D to maintain a fixed orientation such that laser beam 148D points in a more parallel path to the other laser beams. Laser 102D can be referred to as a distance attachment laser. The plurality of legs 106C and 106D can be referred to as a plurality of distance attachment legs.

Optionally, and to improve accuracy and easy of use laser 102D can be positioned at a slight angle or pitch to allow for laser 102D motion through the arc 154 and to compensate for the physical offset of the lasers where laser 102D may not be in the same plane as lasers 102A, 102B, and 102C. As such, a slight pitch in laser 102D can allow the laser beam 148D as it pans through arc 154 to intersect with laser beams 148A, 148B, and 148C. In this regard, in an exemplary embodiment a pitch of approximately three degrees can compensate for the laser 102D physical offset. Such a physical offset can occur when laser 102D is orientated in the horizontal plane above the other lasers (102A, 102B, and 102C) to allow laser 102D to be able to swing across the top of the other lasers or pan in an arc 154 over the other lasers 120A, 102B, and 102C. Leg 106C attachment to the intersection of leg 106A, 106B and leg 106D attachment to the angular measurement device 150 allows the distance finding attachment to pan through an arc 154 across the other lasers 102.

An angular measurement device 150 can be utilized to measure the motion and relative swing or pan through the arc 154 laser 102D makes as it moves between laser positions 102A, 102B, and or 102C and across the associated projected laser beams 148A, 148B, and or 148C. Through calculations and input from the angular measurement device 150 calculations of the LENGTH and or DISTANCES related to the various laser beams 148 and the object being measured can be effectuated.

In an exemplary embodiment a user can determine the LENGTH and or DISTANCE of an object using the optical measuring device 100 by performing the following: positioning laser beam 148A emitted from laser 102A at a first edge of or point on the object; positioning laser beam 148C emitted from laser 102C at a second edge or point on the object; positioning the distance finding laser beam 148D emitted from laser 102D at the location of one of the laser beams 148A, 148B, or 148C; initializing the angular measurement device 150 to a position or known value; moving laser 102D through an arc from the intersection of at least one laser beam 148A, 148B, or 148C to a second different laser beam 148A, 148B, or 148C; determining the length based on angular data obtained from the motion of the laser 102D, the angular determination device, and selectively the angular determination interface 516, or determining other desired calculations by way of an interconnected electronic system 500. In this regard, the angular measurement device 150 can be used in combination with laser 102D and the motion laser 102D makes to determine the DISTANCE of and or LENGTH related to the object being measured, wherein the LENGTHS of the object and or the DISTANCES associated with the object being measured are related to the length or distance between laser beams 148.

Figure 2A:
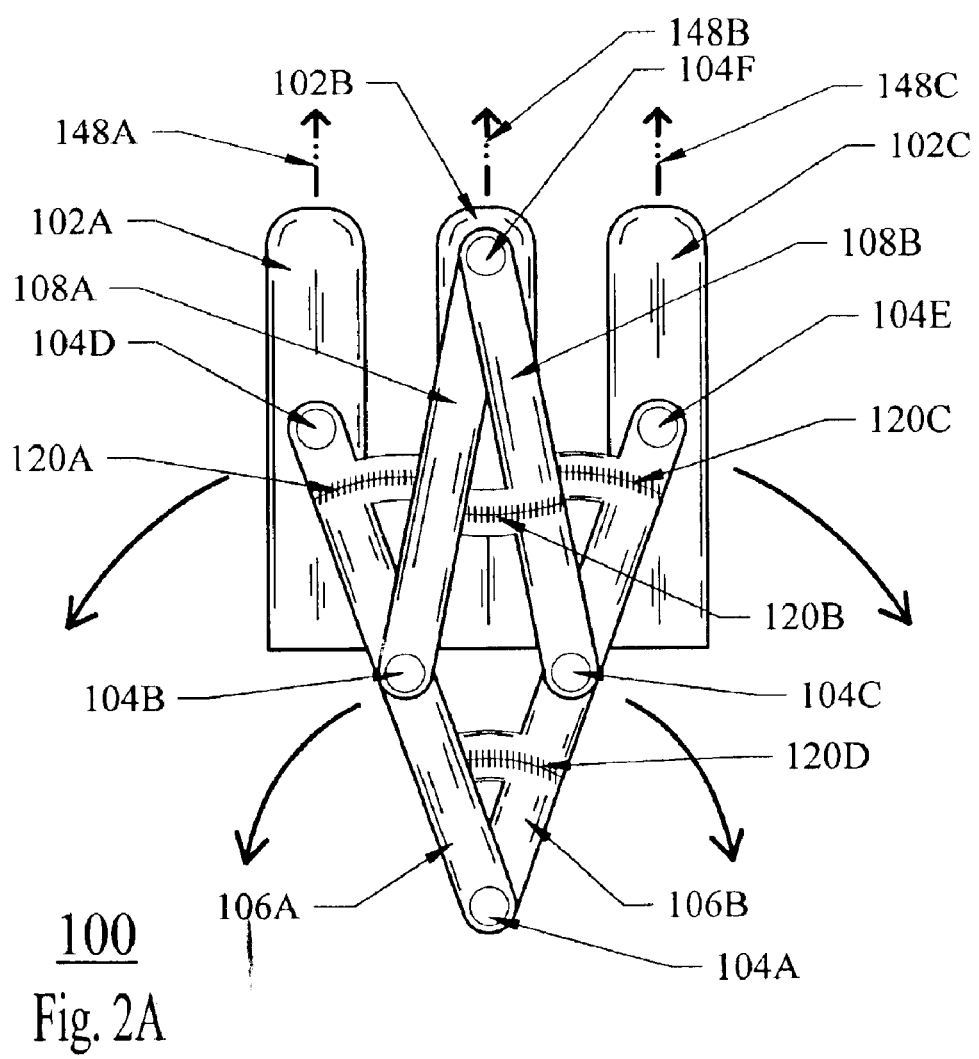
FIG. 2A there is shown an optical measuring device 100 with angle indicia on certain legs to indicate angles between the interconnecting legs.

Referring to FIG. 2A there is shown an optical measuring device 100 with indicia inscribed on the plurality of legs 106 and 108. In addition, the plurality of legs 106 and 108 have an extension with indicia thereon as part of the leg element, such that the angle between legs, adjacent legs, and fastened legs can be visually determined.

In an exemplary embodiment, the indicia inscribed on the leg extensions can provide information related to the angle of the lasers and the angles between the plurality of the legs 106 and 108. As such, inscribed indicia can be used in calculations, as may be required, or desired to make determinations about the object being measured.

Figure 2B:
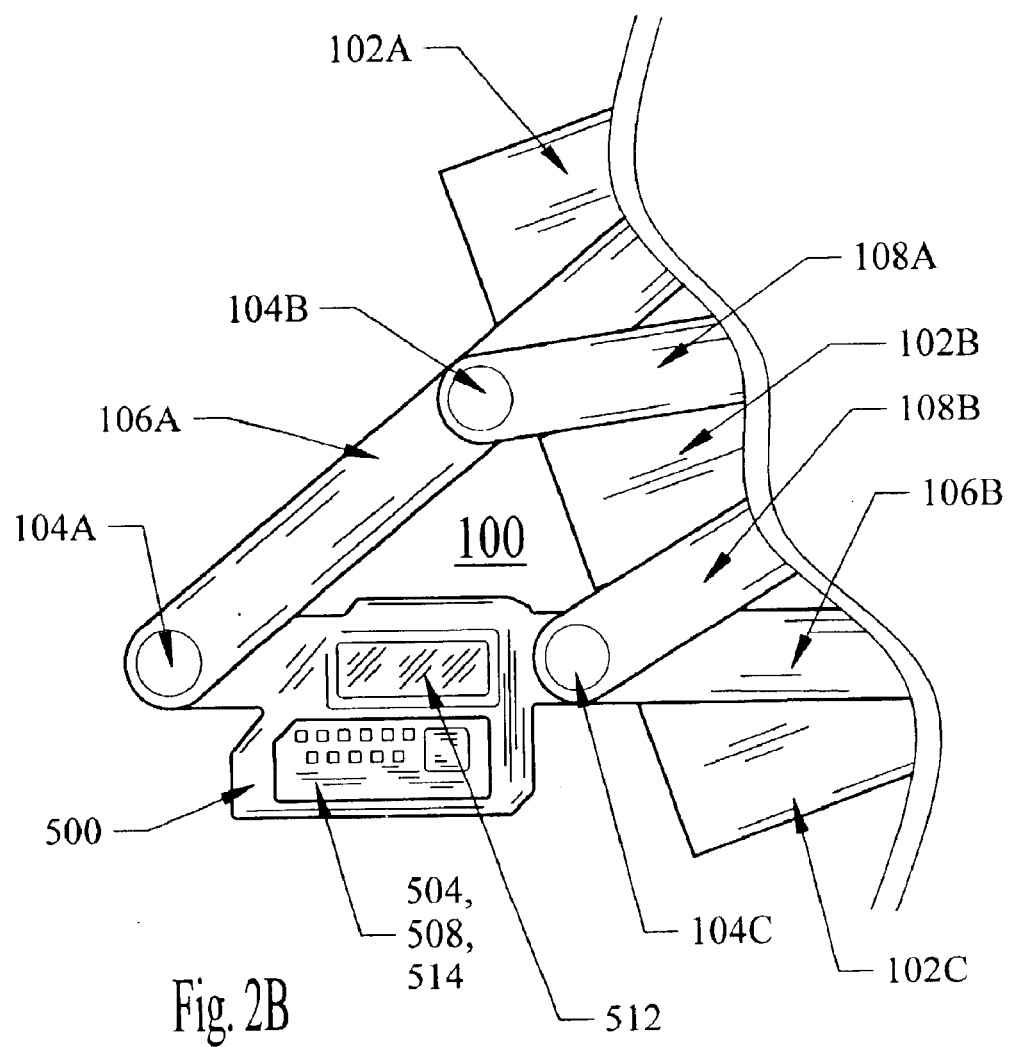
FIG. 2B there is shown an optical measuring device 100 having an electronic system 500.

Referring to FIG. 2B there is shown an optical measuring device 100 having an electronic system 500 incorporated thereon. Shown in FIG. 2B is an electronic system 500 interconnected to or associated with leg 106B. In a plurality of exemplary embodiments electronic system 500 can be attached to or incorporated with any of the plurality of legs 106 and or 108 as may be desired or required in a particular embodiment. The electronic system 500 shown in FIG. 2B has a display 512, a user input interface 508, and a data communication interface 514. Other electronic system 500 features and elements can be included or excluded as may be required or desired in a particular embodiment.

In an exemplary embodiment an electronic system 500 can be used for calculation and display of results related to measurements being made by the optical measuring device 100. In this regard, the electronic system 500 being a microcontroller based device can be used to store measurements, conversions, and other information related to user preferences and or information related to the usage of the optical measuring device 100, and or the objects being measured.

The electronic system 500 being incorporated on one of the device 100, for example and not limitation leg 106 and or leg 108 can offer certain advantages to the user of the device 100. Such advantages can include, but not be limited to, the ability to make direct angle measurements of the device 100 legs 106, 108, 140, 142, and or 146 and effectuate calculated results, which the electronic system 500 may determine with or without user intervention, as well as provide other system input and output functionality as may be required and or desired in a particular embodiment.

Referring to FIG. 2C there is shown an optical measuring device 100 with an electronic system 500 incorporated thereon. In this exemplary embodiment the electronic system 500 is interconnected with the optical measuring device 100 leg 106B. In addition, the electronic system 500 enclosure encompasses the interconnection of legs 106A and 106B. In this regard, the electronic system 500 can monitor the angle between legs 106A and 106B. In such an embodiment, the electronic system 500 can then use information related to the angle between the legs, and other information to perform calculations, provide results or feedback to a user via the display 512, for data communication to other data processing device, or for other purposes.

For example and not limitation, a user of the optical measuring device 100 can activate the device by opening the legs 106A and 106B. The electronic system 500 can detect the movement of the legs and activate the lasers and the electronic system 500 electronics for use. In this regard, opening the legs of the device can serve to activate the device for use. Furthermore, the closing of the legs 106A and 106B of this device can also be monitored by the electronic system 500. Upon detection of the closing of the legs 106A and 106B the electronic system 500 can turn 'OFF' the lasers 102 and shut down, placing itself in a 'no power' or 'low power' mode of operation, and or suspend electronic system 500 operation as may be required or desired in a particular embodiment.

Alternatively, the movement of the legs can reset an electronic system 500 timer which upon elapsing causes the electronic system 500 to initiate certain actions, including shutting down, entering a 'no power' or 'low power' mode of operation, suspend operation, or to initiate other actions as may be required or desired in the embodiment. In this regard, the electronic system 500 timer is continually reset as long as the device is being used. After use of the device 100 subsides and a period of inactivity is detected, the preset electronic system 500 timer can be allowed to elapse and the device deactivated as a way of, among other things, saving battery power.

In an exemplary embodiment, for example and not limitation, a user of the optical measuring device 100 can open the plurality of legs 106A and 106B sighting the laser beam 148A at one desired point on the object and sighting the laser beam 148C at a second desired point on the object. Laser beam 148B emitted from laser 102B indicates the CENTER point between lasers 102A and 102C. In addition, the electronic system 500 having recorded the angular position between the legs 106A and 106B can now perform certain calculations including, among other things, determining the angle of the legs 106 and 108, the distance of separation of the laser beams 148, and other calculations. Such other calculations can include using data that may be obtained from the electronic system 500 monitoring, user input, and or other data/information as may be deduced by the use of the electronic system 500 and device 100. Furthermore, such data/information, calculations, and results can be stored, obtained from or communicated by the user and or between data processing resources.

Figure 2D:
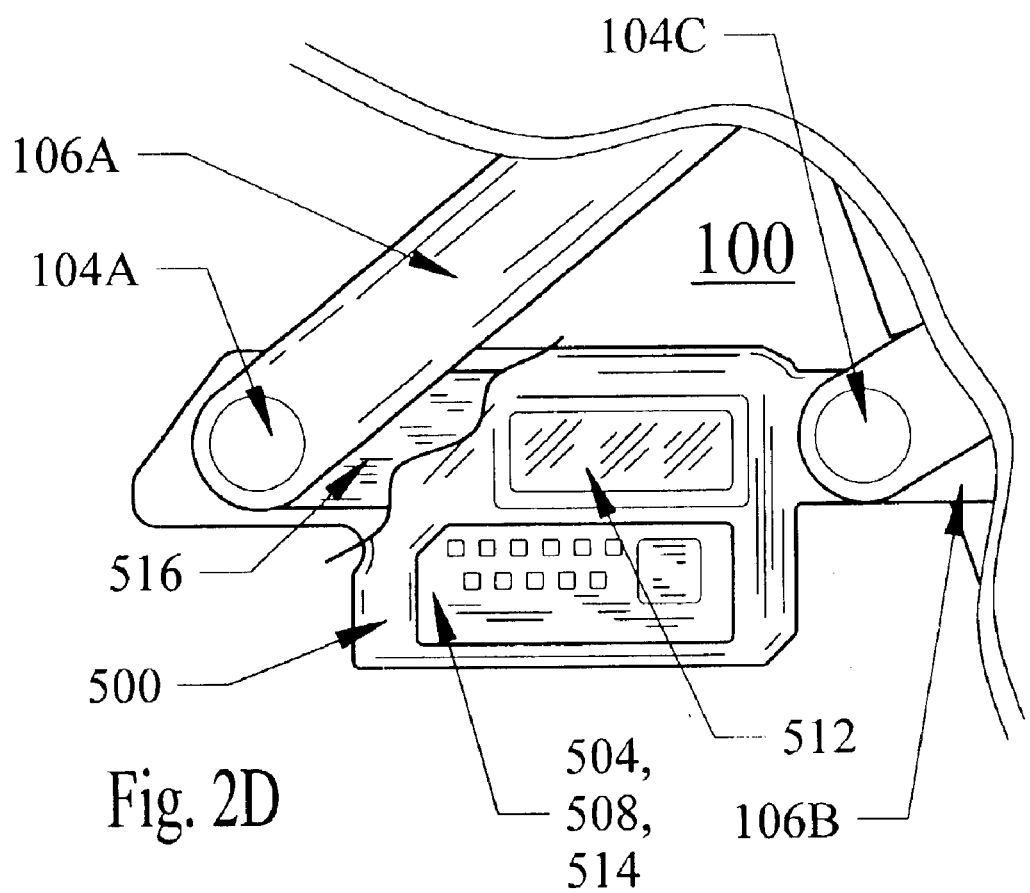
FIG. 2D there is shown an optical measuring device 100 having an electronic system 500 enclosure cut-away to show an angular measurement device incorporated therein.

Referring to FIG. 2D there is shown an optical measuring device 100 having an electronic system 500 with a cut-away section exposing legs 106A and 106B. With the cut-away section removed the angular determination interface 516 area can be seen. In this regard, the angular determination interface 516 can monitor the angles between legs 106A and 160B. Though in this embodiment legs 106A and 106B have been chosen as legs to be monitored, in other required or desired embodiments other legs, any angle and any number of angles associated with the optical measuring device 100 can be monitored by an electronic system 500, an angular determination device 150, and or an angular determination interface 516.

Figure 3:
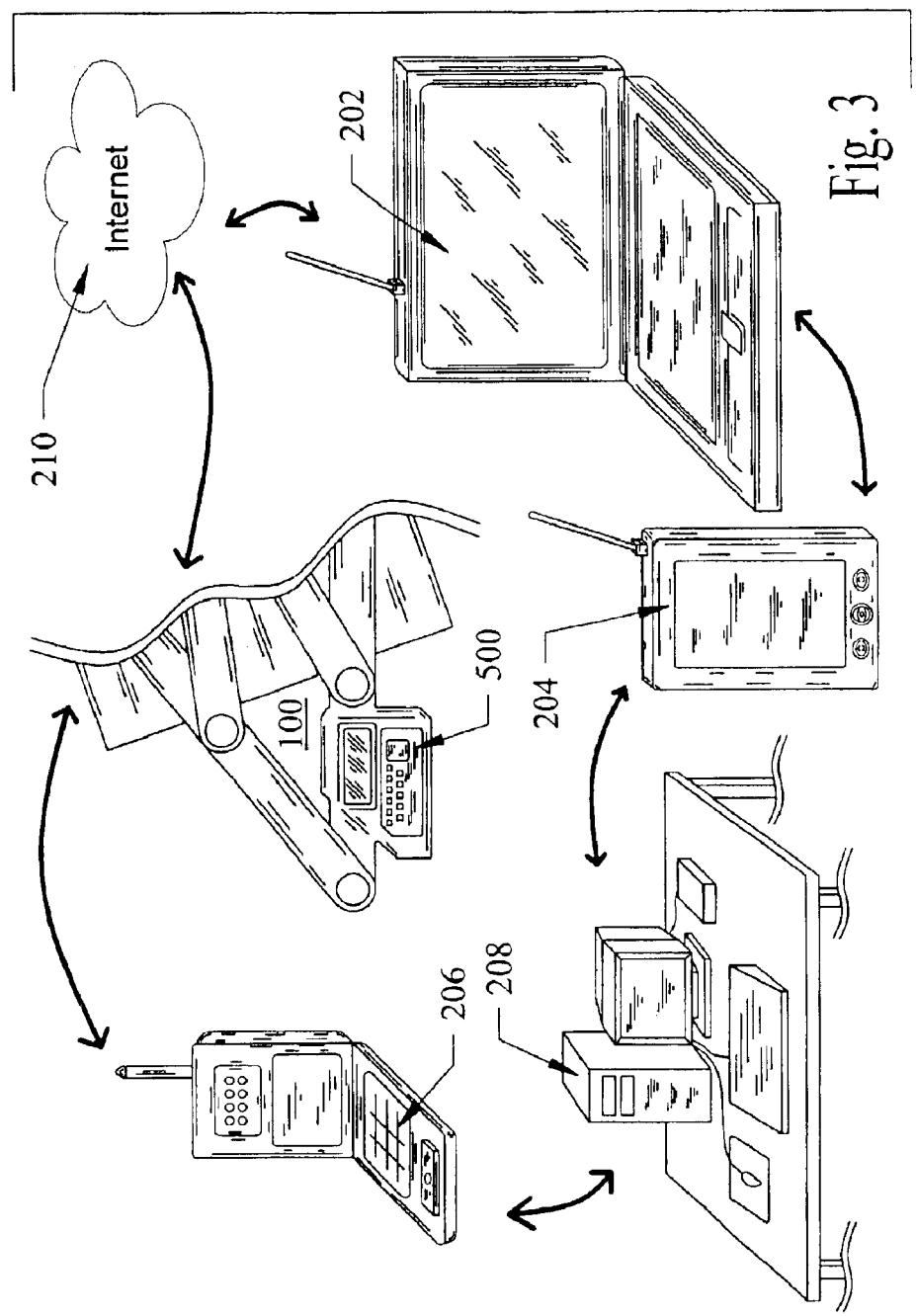
FIG. 3 there is shown a plurality of data communicating devices effectuating data communication between a plurality of data communicating devices and or over a global network.

Referring to FIG. 3 there is shown an optical measuring device 100 implementing a local area network (LAN network) to effectuate data communication between a plurality of data processing devices. In an exemplary embodiment an optical measuring device 100 can access a LAN and or a wide area network (WAN network) for data communications over a global network between remote global network based data processing resources. The Internet is a global network and can be referred to as a global network, and or as a remote global network based data processing resource. In this regard, the LAN and WAN can be wired and or wireless. Wired LAN or WAN connectivity can include ETHERNET, FIREWIRE, and other similar or suitable, desired, or required wired LAN or WAN connectivity. Wireless LAN and WAN data communications and interfaces can be implemented by way of proprietary wireless standards and protocols, Institute of Electronics Engineers standards (IEEE) wireless protocols and standards, 3COM devices, a WISMO device, wireless standards and protocols, SIERRA WIRELESS devices, wireless standards, and protocols wireless application protocol (WAP), CDPD, PCS, WCDMA, CDMA, TDMA, TDD, CDMA 2000, 1XRT, GSM, general packet radio service (GPRS), enhanced data rates for global evolution (EDGE), TDMA, 2G/2.5G type communication ('G' is an abbreviation for generation—for example, 2G is second generation technologies), 3G and 4G type communication, infrared data communication (IRDA), IEEE 802.11'x' ('x' meaning all types and kinds of 802.11 standards and protocols including 'a', 'b', and 'g'), WI-FI, INTEL PRO/WIRELESS 5000 LAN, BLUETOOTH compliant standards and protocols, small device microwave, spread spectrum, 2.4 GHZ, 900 MHZ, a single frequency transceiver, a dual frequency transceiver, Internet service provider (ISP), a TCP/IP connection, a PPP, SLIP, or SOCKET layer connection, a RAS connection, by utilizing wireless Internet standards or protocols, or other Internet connection points or connection types or other suitable wired and or wireless standards, frequencies, or protocols.

Shown in FIG. 3 is a plurality of wired and wireless data processing devices networked to an optical measuring device 100. These data processing devices include, a wireless phone 206, a personal data assistant (PDA) 204, a laptop PC 202, and a personal computer (PC) 208. Other similar, suitable, desired, and or required peripherals can be networked to the optical measuring device 100 in a wired or wireless manner.

The optical measuring device 100 can also effectuate a wired and or wireless WAN data connection. Such a wired and or wireless WAN data connection can include Internet based and non-Internet based data connections.

A wireless phone 206 can be referred to as a data processing device. In an exemplary embodiment an optical measuring device 100 can data communicate with a wireless phone 206. In operation, this can allow the wireless phone 206 to data communicate with an optical measuring device 100 and other data processing devices by way of a wired and or wireless connection. A wireless phone 206 can be a NOKIA, INTERDIGITAL, NOVATEL, ERICKSON, CINGULAR, MOTOROLA, QUALCOM, AUDIOVOX, SPRINT, AT&T, OMNIPOINT, or other similar technologies, brands or types of wireless phones.

A personal data assistant (PDA) 204 can be referred to as a data processing device. In this embodiment an optical measuring device 100 can data communicate with a PDA 204. In operation, this can allow the PDA 204 to data communicate with an optical measuring device 100 and other data processing devices by way of a wired and or wireless connection. A PDA 204 can be referred to as a pocket-sized personal computer. A pocket-sized personal computer can be a MICROSOFT POWER PC, a HEWLETT PACKARD device including the JORNADO, a CASIO device, a COMPAQ device including the IPAC, a PALM device, a 3COM devices, or other similar or suitable handheld pocket-sized personal computer as may be required and or desired.

A personal computer (PC) system 208 interconnected with an optical measuring device 100. The PC 208 can interconnect with several peripheral devices including a monitor, a mouse, and a keyboard. Other peripheral devices can be interconnected with a PC 208. Other peripheral devices can include printers, scanners, modems, bar code readers, as well as other PC 208 compatible peripheral devices. A PC 208 can be an industry standard INTEL x86 CELERON, or Pentium compatible processor or an AMD x86 compatible or ATHLON processor based system. In addition, a PC 208 can be an APPLE based system. PC's manufactured by DELL, GATEWAY, IBM, APPLE, or similar architectures can be a PC 208. A PC 208 can also take the form of a laptop or notebook 202, or personal data assistant (PDA) 204.

Figure 4A:
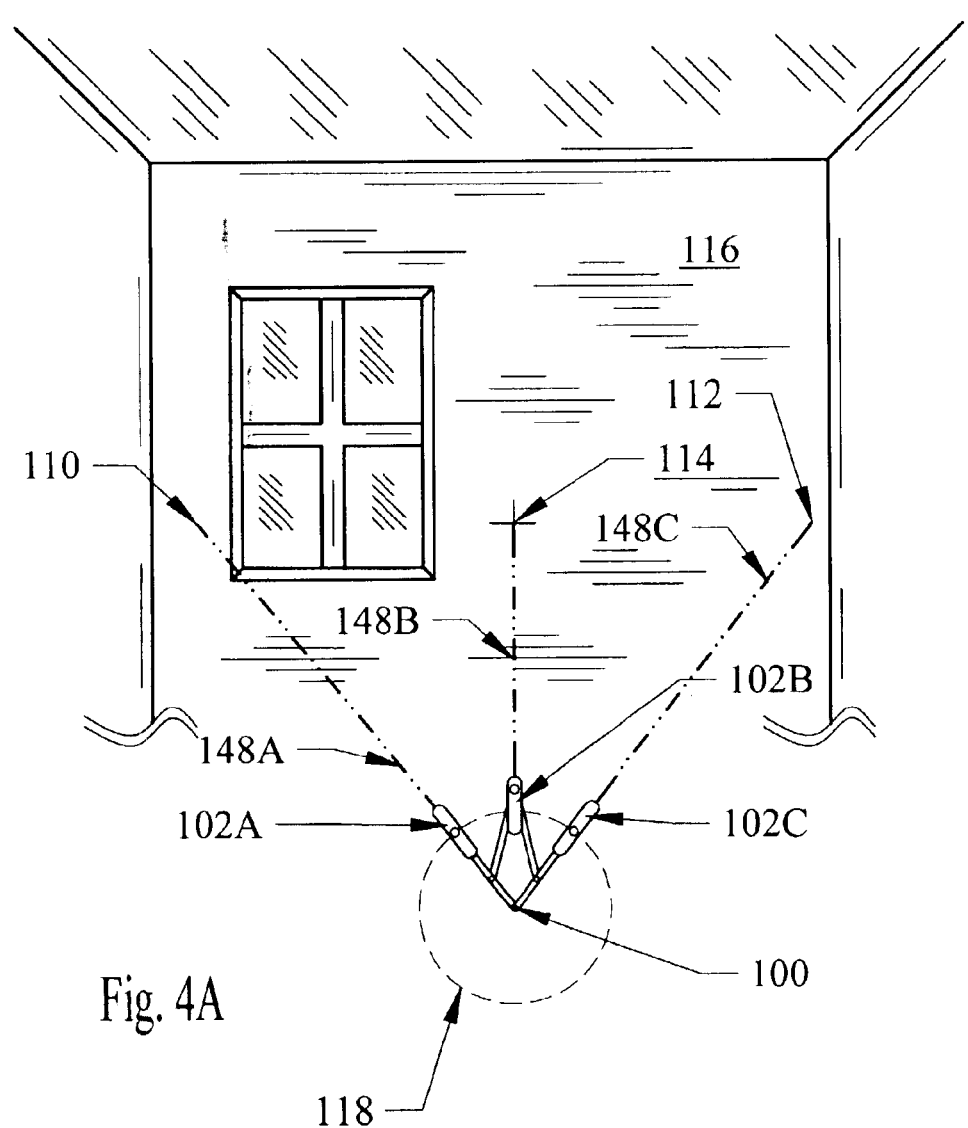
FIG. 4A there is shown an optical measuring device 100 locating the CENTER of a wall 116.

Referring to FIG. 4A there is shown an optical measuring device 100 locating the CENTER point on a wall. In an exemplary embodiment, a user of the optical measuring device 100 can sight reference laser beam 148A, which is emitted from laser 102A at a first reference point on the wall 110. The user can then sight reference laser beam 148C, which is emitted from laser 102C at a second reference point on the wall 112. The laser beam 148B, which is emitted from center laser 102B, is automatically positioned on the wall at a CENTER point 114, which is equidistance between the first reference point on the wall 110 and the second reference point on the wall 112. It is the interrelationship between the interconnected plurality of legs 106 and 108 that positions the CENTER laser 102B at the correct orientation such that laser beam 148B illuminates a point which is equidistance between reference point laser beam 148A and reference point laser beam 148C.

In another exemplary embodiment, the optical measuring device 100 utilizing a distance finding attachment as shown in FIG. 1I can be utilized to determine certain measurements of LENGTH and DISTANCE related to the measured object as may be required or desired by a user.

In addition, interchangeable projection heads 122 such as those shown in FIG. 1E and patterns shown in FIG. 1F can be used on any of the lasers 102 to provide optical patterns which may make measurement and visibility easier and or more desirable. FIG. 1F illustrates several laser patterns, which can be effectuated by the user by using the interchangeable projection heads 122.

Furthermore, in an exemplary embodiment, as an example and not a limitation, a bubble level 134, a tube level 136, or an electronic system 500 level can be utilized to mark points which are CENTER and LEVEL with respect to the plurality of laser beam points 148. Additionally, an electronic system 500 can be incorporated into the optical measuring device 100 and measurements from the optical measuring device 100, in combination with other data and or other data processing resources, can be utilized to perform data processing tasks including calculations, data processing, data communication, storage of results, and or other data processing tasks. Such data processing tasks can be data communicated to other data processing devices as may be required and or desired.

In addition, such data processing tasks can be uniquely identifiable by the electronic system 500 such that an association of the calculations and data can be made with the objects measured such that further analysis, computation, and or data processing tasks can include specifics as to when, where, and how such data was obtained and or calculated. Such a feature of the electronic system 500 can allow the optical measuring device 100 to acquire data and measurements, store the results, uniquely identify the results, data communicate the results to another data processing device, for use by other software programs and systems including computer aided design systems and software.

Figure 5A:
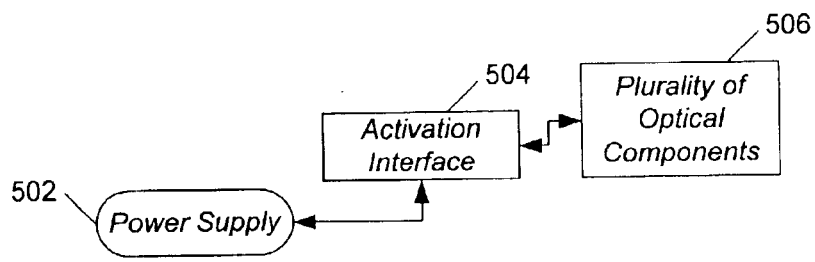
FIG. 5A there is shown an electronic system 500 embodiment incorporating a power supply 502, an activation interface 504, and a plurality of optical components 506.

Referring to FIG. 5A there is shown a simplified electronic system 500. In this embodiment a power supply 502 is interconnected with an activation interface 504, which in turn is interconnected with and operationally related to a plurality of optical components 506.

In an exemplary embodiment a plurality of optical components can include a plurality of lasers or a plurality of light sources. In this regard, laser beams or light beams may be emitted from the plurality of optical components as may be required and or desired by a particular optical measuring device 100 embodiment.

In an exemplary embodiment an electronic system 500 can be incorporated into an optical measuring device 100. In such an embodiment the electronic system 500 can activate, monitor, provide computation results, store results, and or provide other data processing capabilities. In a simplified electronic system 500, a microcontroller may not be present or required for device operation. As such, a minimum set of elements can comprise the electrical make up of the optical measuring device 100. FIG. 5A illustrates such a simplified electronic system 500.

A power supply 502 can include batteries, solar cells, and or other similar or suitable power supplies as may be required or desired in the embodiment. Activation interface 504 can include push buttons, momentary push buttons, and timers to govern the activation and control of the plurality lasers 102. An activation interface 504 can include timer controls after a button press, means for detecting the opening and closing of the optical measuring device 100 legs 106 and or 108, and or other similar or suitable activation devices as may be required or desired by the embodiment.

The plurality of optical components 506 can include lasers, and or other similar or suitable optical components as may be required or desired by the embodiment. Such lasers can include the types commonly used for pointing devices, helium neon type of lasers, red, green, violet, blue, near infrared (NIR) types or kinds of lasers, diode lasers, diode pumped lasers, and or other similar, suitable, or desired types and or kinds of lasers.

Figure 5B:
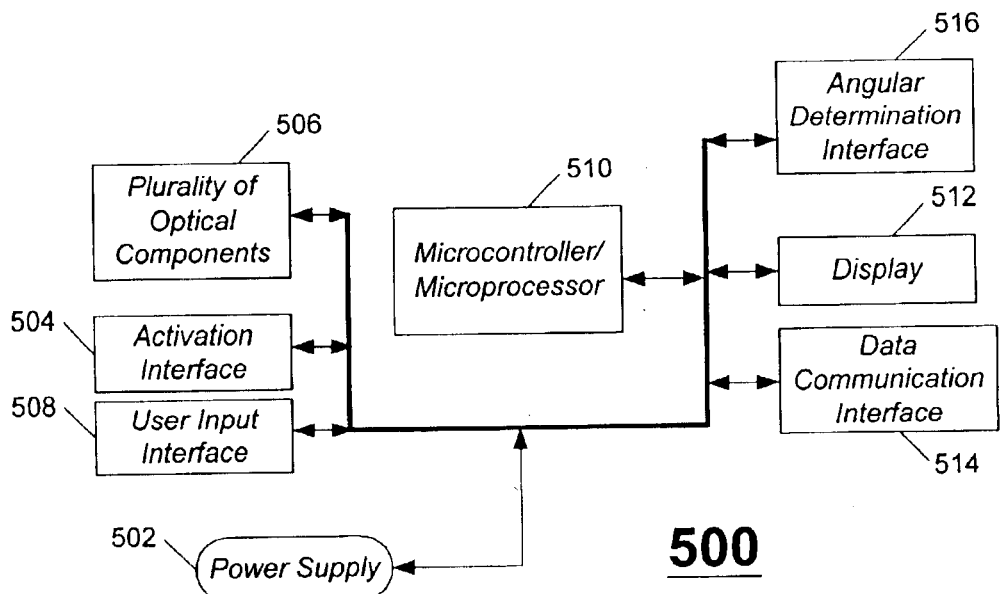
FIG. 5B there is shown an electronic system 500 embodiment incorporating an angular determination interface 516, a display 512, and a data communication interface 514.

Referring to FIG. 5B there is shown an electronic system 500 embodiment incorporating among other things an angular determination interface 516, a display 512, and data communication interface 514. In an exemplary embodiment electronic system 500 can be incorporated with an optical measuring device 100 such that calculations, results, data processing tasks, result storage, data communication, and or other desired, and or required task can be effectuated.

Interconnected with a microcontroller 510 can be a plurality of optical components 506. In addition, a user input interface 508 can be interconnected with a microcontroller 510. In an exemplary embodiment microcontroller 510 can be an INTEL X scale, strong arm, PENTIUM, x86, MICROCHIP, AMD, ZILOG, MOTOROLA POWERPC, 68 HC, ARM, Hitachi, Rabbit, Sanyo and or other similar, or suitable microcontroller. A microprocessor can be referred to as a microcontroller, and or microcontroller 510. Microcontroller 510 can also incorporate memory. Such memory can include read only memory (ROM), random access memory (RAM), flash memory, Serial I2C flash memory, and other types, kinds, similar, and or suitable memory. Memory can also be located and interconnected with, but external to, microcontroller 510.

Furthermore, an electronic system 500 can operate on an embedded binary input-output system (BIOS) including a PC style BIOS and can run embedded system operating systems. Embedded system operating systems (OS) can include OSEK, OSEK/VDX, PALM OS, LINUX, WINDOWS 9x, WINDOWS 2000, WINDOWS CE, XP, NT, embedded NT, MIRA, QNX NEUTRINO, and other embedded system operating systems. In addition, development tools and application software can include MICROSOFT VISUAL STUDIO development tools and application software, VIRTUAL JAVA MACHINE (JVM) development tools and application software, and other development tools and application software.

In an exemplary embodiment the activation interface 504 can be interconnected with microcontroller 510. The activation interface 504 can include a keypad of buttons, momentary push buttons, and timers to govern the activation and control of the plurality lasers 102. An activation interface 504 can include timer controls after a button press, means for detecting the opening and closing of the optical measuring device 100 legs 106 and or 108, and or other similar or suitable activation devices as may be required or desired by the embodiment.

User input interface 508 can include user input devices. Such user input devices can include key entry, biometric input, push button input, touch pad/screen, optical sensing, capacitive sensing, an electronic device to be used as a LEVEL and or devices to indicate the tilt of the optical measuring device 100. In addition, such user input devices can include an elevation meter to indicate the relative altitude of the optical measuring device 100, voice input and or other similar, suitable, user input devices as may be required, and or desired by a particular embodiment.

Also interconnected with a microcontroller 510 can be an angular determination interface 516, a display 512, and a data communication interface 514.

An angular determination interface 516 can include devices and components to monitor, read, and or determine angles between the various legs of the optical measuring device 100. Such devices and components can include optical devices for measurement, magnetic devices such as hall effect devices, analog devices for measurements including potentiometers, and or digital devices to effect measurements.

A display 512 can include a variety of user feedback devices. Such user feedback devices can include liquid crystal display (LCD), a light emitting diodes (LED), organic light emitting diodes (OLED), polymer light emitting electrochemical cells (LECs), and or other similar, suitable, required, and or desired user input interface devices.

A data communication interface 514 can include a plurality of devices and interfaces to affect data communication with other data processing resources. Such devices and interfaces can include wired and wireless WAN and LAN data communications and interfaces. Such WAN and LAN data communications can be by way of proprietary wireless standards and protocols, Institute of Electronics Engineers standards (IEEE) wireless protocols and standards, 3COM devices, wireless standards and protocols, SIERRA WIRELESS devices, a WISMO device, wireless standards, and protocols wireless application protocol (WAP), CDPD, PCS, WCDMA, TDMA, TDD, CDMA, CDMA 2000, GSM, 1X 3G, general packet radio service (GPRS), enhanced data rates for global evolution (EDGE), TDMA, 2G/2.5G type communication ('G' is an abbreviation for generation—for example, 2G is second generation technologies), 3G and 4G type communication, infrared data communication (IRDA), IEEE 802.11'x' ('x' meaning all types and kinds of 802.11 standards and protocols including 'a', 'b', and 'g'), WI-Fl, INTEL PRO/WIRELESS 5000 LAN, BLUE TOOTH compliant standards and protocols, small device microwave, spread spectrum, 2.4 GHZ, 900 MHZ, a single frequency transceiver, a dual frequency transceiver, Internet service provider (ISP), a TCP/IP connection, a PPP, SLIP, or SOCKET layer connection, a RAS connection, by utilizing wireless Internet standards or protocols, or other Internet connection points or connection types or other suitable wireless standards, frequencies, or protocols. Other wired data communications can include RS232 and RS485 communications as well is USB and or other similar or suitable types and kinds of data communication interfaces.

In an exemplary embodiment, an electronic system 500 incorporated with an optical measuring device 100 can provide a way to store measurements, conversions, and or other types of results. In addition, the electronic system 500 can uniquely identify each measurement and effectuate data processing tasks. In this regard, this enables data communication to other data processing devices, and software applications that can in turn correlate and or use the plurality of measurements for further data processing.

Data communications wired and or wireless with other data processing devices such as PC 208, PDA 204, wireless phone 206, data processing device 214, laptop/notebook computer 202, a global network based data processing resource 212 and or other microprocessor based systems can enable data to be exchanged between the optical measuring device 100 and or local or remote data processing resources. Such data communications can include conversion software applications to be run by the electronic system 500, data, data processing tasks that can improve electronic system 500 operations and functionality, and or external data processing device operations and or functionality.

When an electronic system 500 is embodied with the optical measuring device 100 data processing tasks can include and not be limited to angle determination between the plurality of legs 106 and 108, and or the measurements associated with the plurality of lasers 102, and or other data processing tasks. In addition, calculations and results determined by the electronic system 500 can include DISTANCE, LENGTH, CENTER, LEVEL, PLUMB and or other measurements or characteristics of objects measured by the optical measuring device 100.

Figure 5C:
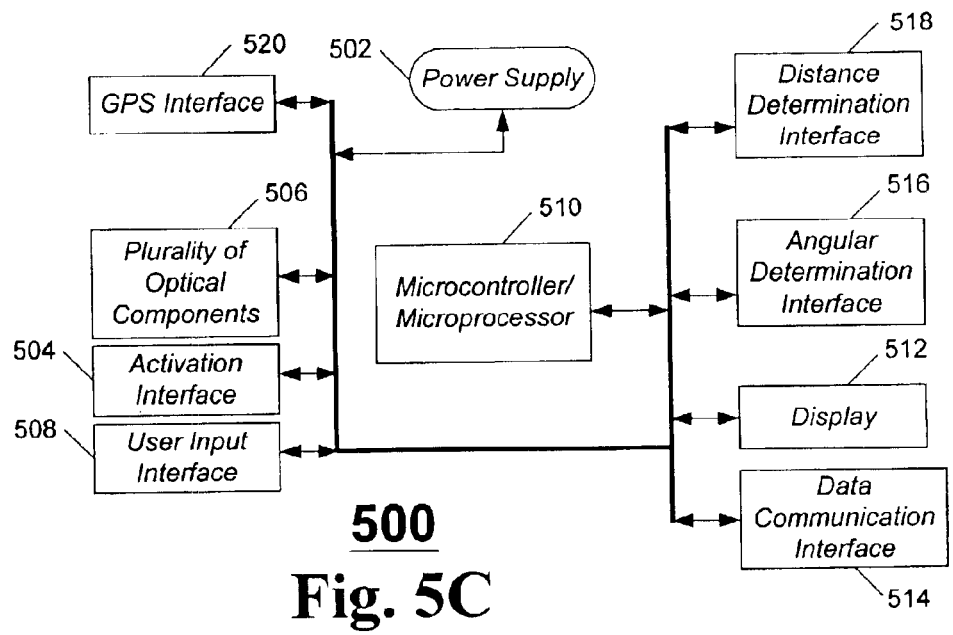
FIG. 5C there is shown an electronic system 500 embodiment incorporating a GPS interface 520, and a distance determination interface 518.

Referring to FIG. 5C there is shown an electronic system 500 embodiment incorporating a global positioning system (GPS) interface 520, and distance determination interface 518. In exemplary embodiment, the optical measuring device 100 can utilize the GPS interface 520 to associate geographic location data with the measurements being made. In this regard, the measurements being made by the optical measuring device 100 can include geographic specific location information (GPS data). Such GPS data in combination with measurement data from the optical measuring device 100 can be data communicated to other data processing devices for further analysis, processing, or other data communication needs.

The GPS interface 520 can be interconnected with microcontroller 510. In addition, a distance determination interface 518 can be interconnected with microcontroller 510. The distance determination interface 518 can be used to determine electronically the DISTANCE between the user and the measured object. In this regard, the DISTANCE between the user and the measured object can then be utilized with angular measurement data to determine the LENGTH of the object being measured, and to determine other results as may be required and or desired. In an exemplary embodiment, a distance termination interface 518 can include ultrasonic, optical, and or other similar, suitable and or required or desired types of devices and interfaces to determine DISTANCE.

Figure 6:
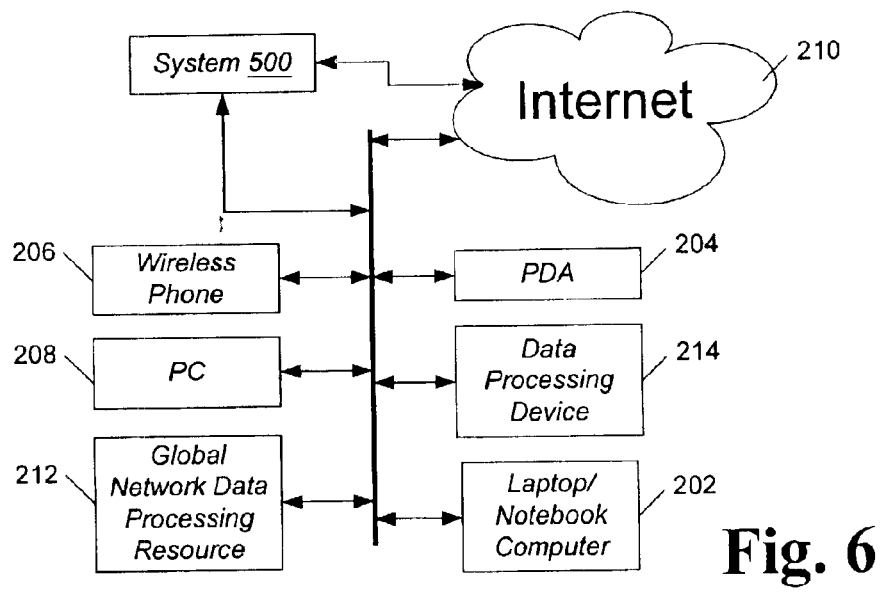
FIG. 6 there is shown an electronic system 500 network that illustrates electronic system 500 data communication with a plurality of data communicating devices, and an electronic system 500 data communicating over a global network to remote global network based data processing resources.

Referring to FIG. 6 there is shown an electronic system 500 network that illustrates electronic system 500 data communication with a plurality of data communicating devices, and electronic system 500 data communication over a global network to remote global network based data processing resources. In an exemplary embodiment, electronic system 500 can data communicate directly with data processing devices such as wireless phone 206, PC 208, global network data processing resource 212, PDA 204, data processing device 214, and or laptop/notebook 202.

In another exemplary embodiment the electronic system 500 can data communicate indirectly via a LAN or WAN data communication connection including data communication over a global network. The Internet can be referred to as a global network. As such, the electronic system 500 can data communicate over a WAN data connection including over Internet 210 to data communicating devices such as wireless phone 206, PC 208, a global network data processing resource 212, PDA 204, data processing device 214, and or laptop/notebook computer 202.

Figure 7:
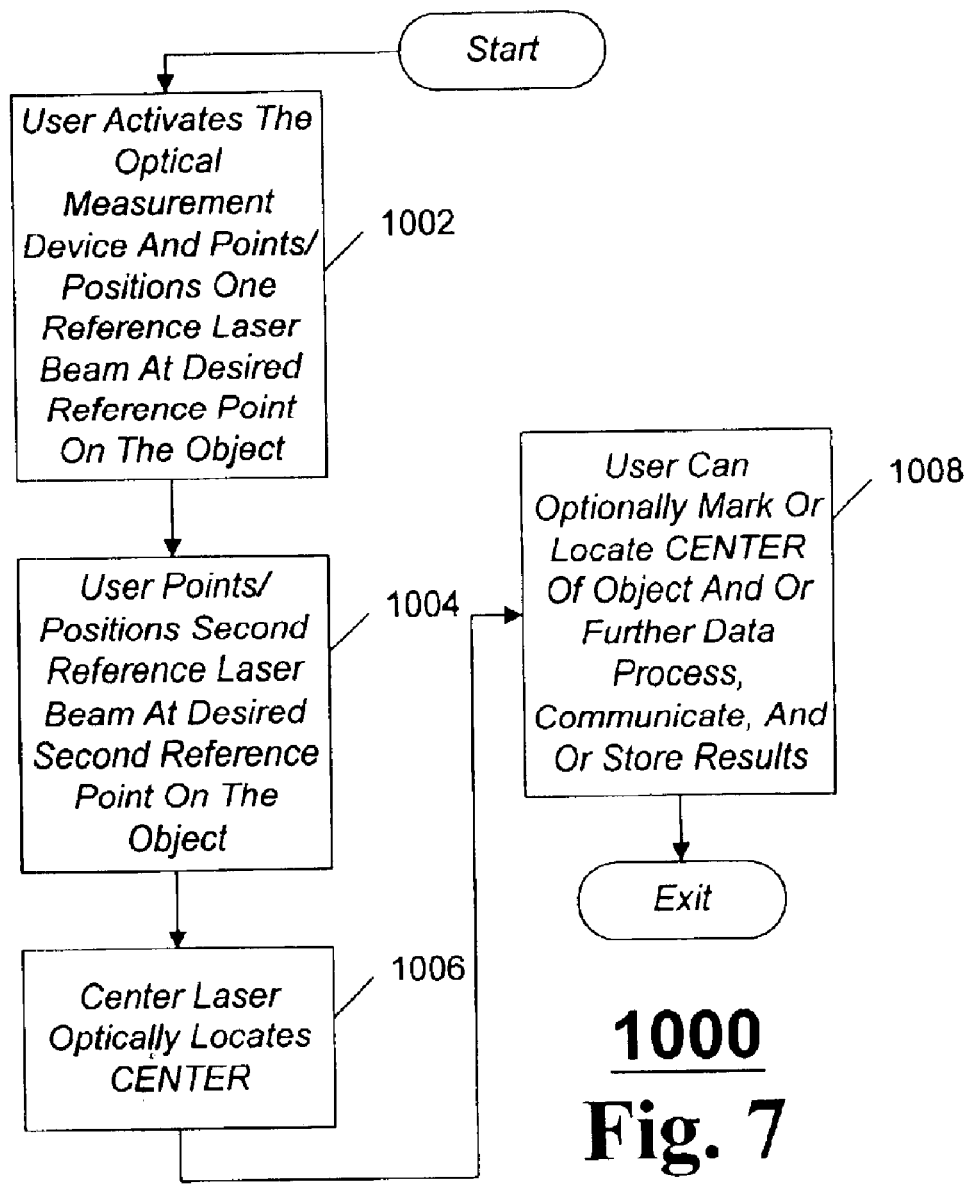
FIG. 7 there is shown a CENTER finding routine 1000.

Referring to FIG. 7 there is shown a CENTER finding routine 1000. In an exemplary embodiment a user of the optical measuring device 100 can determine the CENTER between two reference points on an object. In this regard, the user can direct the laser beams 148A and 148C from two-reference point lasers 102A and 102C at desired reference points on an object. Once the desired points are illuminated by the reference point laser beams 148A and 148C, a CENTER laser 102B, that has been positioned and or adjusted into position by the interconnected plurality of legs 106 and 108, and the motion of the reference point lasers 102A and 102C, will illuminate the CENTER point between the two reference point lasers 102A and 102C. The routine 1000 illustrates the steps, in an exemplary embodiment, required to determine the CENTER location on an object between two reference points. Processing then begins in block 1002.

In block 1002 a user activates the optical measuring device 100 and points or positions one reference laser beam 148A or 148C from lasers 102A or 102C respectively at a desired reference point on the object to be measured. Processing then moves to block 1004.

In block 1004 the user points or positions the second reference laser beam 148A or 148C from lasers 102A or 102C respectively at a second desired reference point on the object to be measured. In this step, the second reference laser beam is the laser beam 148A or 148C that was not previously positioned in step 1002. Processing moves to block 1006.

In block 1006 the laser beam 148B emitted from the center laser 102B optically locates the CENTER of the object being measured between the two reference points. Processing then moves to block 1008.

In block 1008 the user can optionally mark or locate the CENTER of the object being measured and or further data process, communicate, and or store results in an electronic system 500. The routine is then exited.

Figure 8:
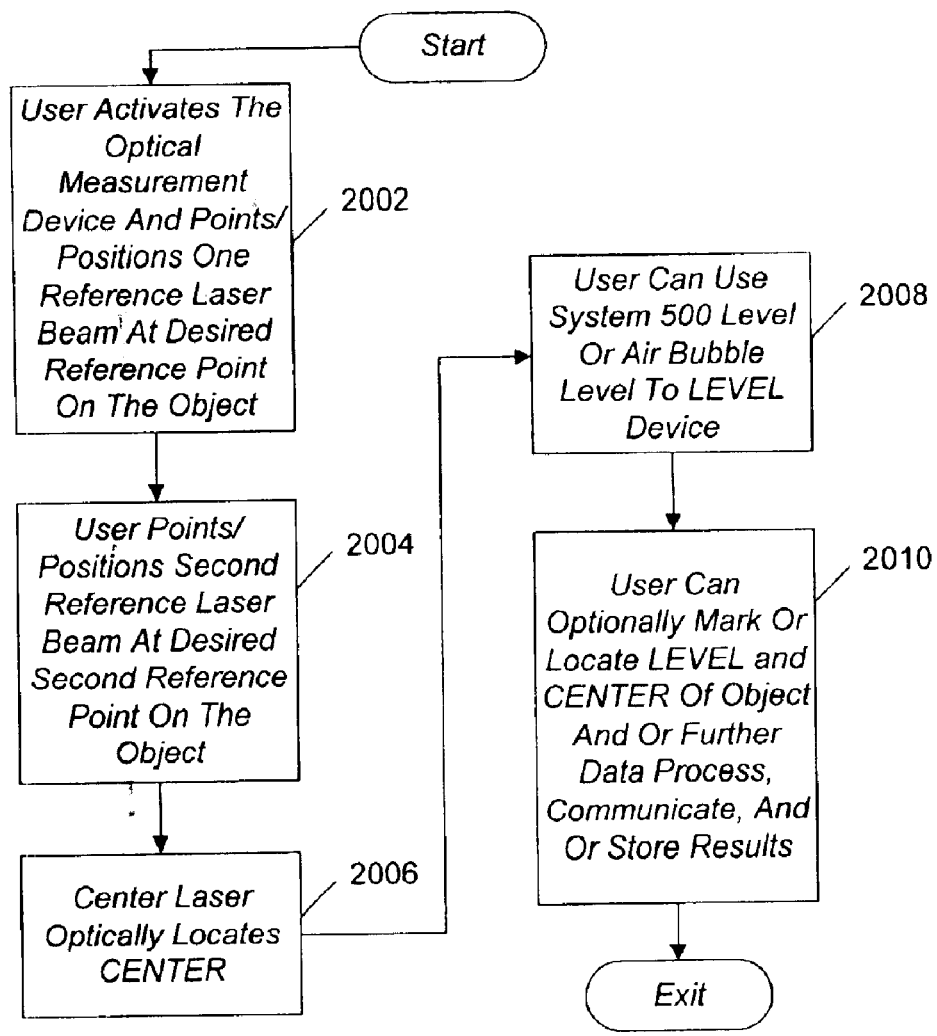
FIG. 8 and there is shown a LEVEL finding routine 2000.

Referring to FIG. 8 there is shown a LEVEL finding routine 2000. In an exemplary embodiment a user of the optical measuring device 100 can determine the CENTER and LEVEL point between two reference points on an object. In this regard, the user can direct the laser beams 148A and 148C from the two-reference point lasers 102A and 102C at desired points on an object. Once the desired points are illuminated by the reference point laser beams 148A and 148C, a CENTER laser 102B, that has been positioned and or adjusted into position by the interconnected plurality of legs 106 and 108, and the motion of the reference point lasers 102A and 102C, will illuminate the CENTER point between the two reference point lasers 102A and 102C. A bubble level 134, tube level 136, and or electronic system 500 level sensing can then be utilized to LEVEL the optical measuring device 100. In this regard, the point illuminated by the center laser 102B and associated laser beam 148B represents a point that is CENTER and LEVEL between the two reference laser beam points 148A and 148C. The routine 2000 illustrates the steps, in an exemplary embodiment, required to determine the CENTER LEVEL location on an object between two reference points. Processing begins in block 2002.

In block 2002 a user activates the optical measuring device 100 and points or positions one reference laser beam 148A or 148C from lasers 102A or 102C respectively at a desired reference point on the object to be measured. Processing then moves to block 2004.

In block 2004 the user points or positions the second reference laser beam 148A or 148C from lasers 102A or 102C respectively at a second desired reference point on the object to be measured. In this step, the second reference laser beam is the laser beam 148A or 148C that was not previously positioned in step 2002. Processing then moves to block 2006.

In block 2006 the laser beam 148B emitted from the center laser 102B optically locates the CENTER of the object being measured between the two reference points. Processing then moves to block 2008.

In block 2008 the user can use the electronic system 500 level, the air bubble level 134, or the tube level 136 to level the optical measuring device 100. In this regard, the center laser beam 148B emitted from laser 102B now illuminates a point which is both CENTERED and LEVEL with respect to the reference points illuminate by the reference laser beams 148A and 148C that are associated with lasers 102A and 102C respectively. Processing then moves to block 2010.

In block 2010 the user can optionally mark or locate the CENTER and LEVEL point on the object being measured and or further data process, communicate, and or store results in an electronic system 500. The routine is then exited.

Figure 9:
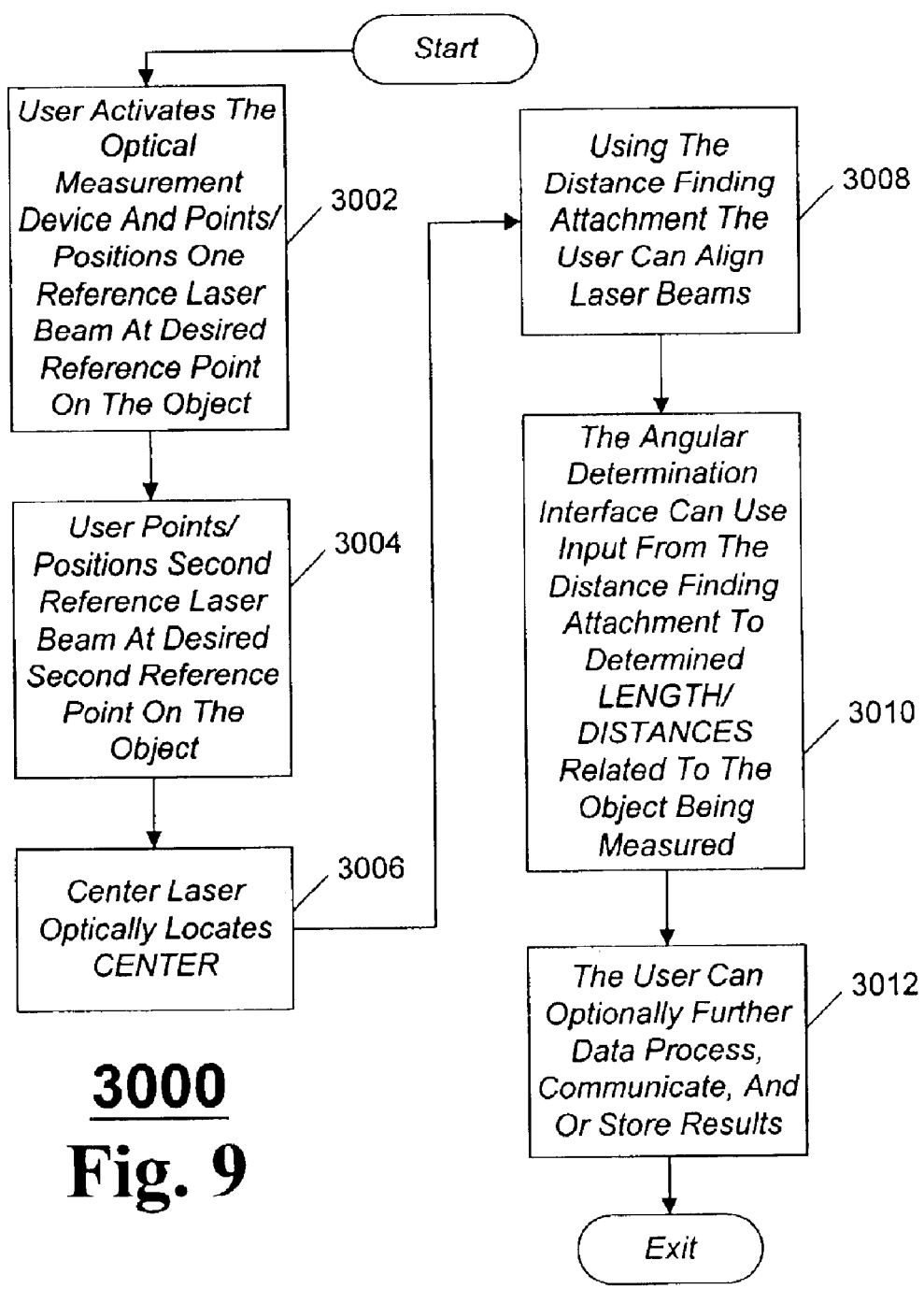
FIG. 9 there is shown a LENGTH and or DISTANCE finding routine 3000.

Referring to FIG. 9 there is shown a LENGTH and or DISTANCE finding routine 3000. In an exemplary embodiment a user of the optical measuring device 100 can determine the LENGTH and or DISTANCE related to an object between two reference points on the object. In this regard, the user can direct the laser beams 148A and 148C from the two-reference point lasers 102A and 102C at desired points on an object. Once the desired points are illuminated by the reference point laser beams 148A and 148C, a CENTER laser 102B, that has been positioned and or adjusted into position by the interconnected plurality of legs 106 and 108, and the motion of the reference point lasers 102A and 102C, will illuminate the CENTER point between the two reference point lasers, 102A and 102C. Optionally, A bubble level 134, tube level 136, and or electronic system 500 sensing can then be utilized to LEVEL the optical measuring device 100. In this regard, the point illuminated by the center laser 102B and associated laser beam 148B represents a point which is CENTER and LEVEL between the two reference laser beam points 148A and 148C.

A distance finding attachment can then be used to determine certain LENGTHS and or DISTANCES related to the object being measured. In this regard, the distance finding attachment having a laser beam 102D can be used to measure the angles, arc path 154, and distance between laser beam points 102A, 102B, and or 102C. Such measurements can be effectuated by way of an angular determination device 150 and or angular determination interface 516. Further data processing, communications, and or results can be effectuated based in part on the measurements obtained by the use of the distance finding attachment. The routine 3000 illustrates the steps required, in an exemplary embodiment, to determine DISTANCES and or LENGTHS related to an object being measured and two reference points using the distance finding attachment. Processing begins in block 3002.

In block 3002 a user activates the optical measuring device 100 and points or positions one reference laser beam 148A or 148C from lasers 102A or 102C respectively at a desired reference point on the object to be measured. Processing then moves to block 3004.

In block 3004 the user points or positions the second reference laser beam 148A or 148C from lasers 102A or 102C respectively at a second desired reference point on the object to be measured. In this step, the second reference laser beam is the laser beam 148A or 148C that was not previously positioned in step 3002. Processing moves to block 3006.

In block 3006 the laser beam 148B emitted from the center laser 102B optically locates the CENTER of the object being measured between the two reference points. Processing then moves to block 3008.

In block 3008 the user can use the distance finding attachment to align the laser beam 148D emitted from laser 102D with laser beams 148A, 148B and 148C. In this regard, and angular determination device 150 and or an electronic system 500 having an angular determination interface 516 can be used to determine the motion, path, and or other characteristics of the distance finding attachment such that further data processing, communication, results, and or other information related to the object being measured including certain DISTANCE and LENGTH measurements can be determined. Processing then moves to block 3010.

In block 3010 the angular determination device 150 and or the angular determine interface 516 can use input from the distance finding attachment to determine LENGTH and or DISTANCES related to the object being measured. Processing then moves to block 3012.

In block 3012 the user can optionally mark or locate points on the object being measured and or further data process, communicate, and or store results in an electronic system 500. The routine is then exited.

While this invention has been described with reference to specific embodiments, it is not necessarily limited thereto. Accordingly, the appended claims should be construed to encompass not only those forms and embodiments of the invention specifically described above, but to such other forms and embodiments, as may be devised by those skilled in the art without departing from its true spirit and scope.

What is claimed is:

1. An optical measuring device comprising:
    a plurality of lasers, said optical measuring device having at least three of said plurality of lasers; and
    a plurality of legs, said plurality of legs are interconnected together, said plurality of lasers are interconnected to certain of said plurality of legs such that the action of positioning, by diverging and varying the angle between the laser beams emitted from at least two of said plurality of lasers at user determined reference points, causes said plurality of legs to align the laser beams emitted from said plurality of lasers at positions as to effectuate a plurality of measurements.

2. The optical measuring device in accordance with claim 1, wherein said plurality of measurements include at least one of the following measurements:
    i) CENTER;
    ii) LEVEL;
    iii) LENGTH;
    iv) DISTANCE; or
    v) PLUMB.

3. The optical measuring device in accordance with claim 1, wherein said optical measuring device further comprises:
    a distance measurement attachment interconnected with said plurality of legs.

4. The optical measuring device in accordance with claim 3, wherein said distance measuring attachment further comprises:
    a plurality of distance attachment lasers;
    a plurality of distance attachment legs, at least one of said plurality of distance attachment legs is interconnected with said plurality of distance attachment lasers; and
    an angular measurement device, said angular measurement device is interconnected with at least one of said plurality of distance attachment legs.

5. The optical measuring device in accordance with claim 1, wherein said optical measuring device further comprises:
    a level interconnected with said plurality of legs or said plurality of lasers.

6. The optical measuring device in accordance with claim 5, wherein said level is at least one of the following:
    i) a tube level;
    ii) a bubble level; or
    iii) an electronic system.

7. The optical measuring device in accordance with claim 1, wherein said optical measuring device further comprises:

a single action alignment leg interconnected with said plurality of legs, wherein the motion of said single action alignment leg moves said plurality of legs and positions said plurality of lasers.

8. The optical measuring device in accordance with claim 1, wherein said optical measuring device further comprises:
an electronic system attached to said optical measuring device.

9. The optical measuring device in accordance with claim 8, wherein said electronic system further comprises at least one of the following:
i) a microcontroller;
ii) an angular determination interface;
iii) a display;
iv) a data communication interface;
v) a user input interface;
vi) an activation interface;
vii) a plurality of optical components;
viii) a GPS interface; or
ix) a distance determination interface.

10. The optical measuring device in accordance with claim 9, wherein communication by way of said data communication interface, said display, or said user input interface includes communicating by way of at least one of the following:
i) a keypad;
ii) a touch screen;
iii) a LCD display;
iv) an IRDA interface;
v) a plurality of general purpose input and or outputs;
vi) a wired interface;
vii) a wireless interface;
viii) a PDA interface;
ix) voice activation;
x) an RS232 interface;
xi) an RS485 interface; or
xii) a USB interface.

11. The optical measuring device in accordance with claim 8, wherein said electronic system further comprises a data communication interface, said data communication interface data communicates with other data processing devices by way of at least one of the following:
i) a hard wired electrical connection;
ii) a wireless connection;
iii) serial data communication;
iv) LAN;
v) WAN;
vi) TCP/IP;
vii) ETHERNET;
viii) FIREWIRE;
ix) WIRELESS APPLICATION PROTOCOL;
x) WI-FI;
xi) BLUETOOTH;
xii) WCDMA;
xiii) IRDA;
xiv) GSM;
xv) PCS;
xvi) GPRS;
xvii) IXRT;
xviii) CDMA;
xix) CDMA 2000;
xx) WCDMA;
xxi) CDPD;
xxii) TDMA;
xxiii) 2G type compliant;
xxiv) 2.5G type compliant;
xxv) 3G type compliant;
xxvi) 4G type compliant;
xxvii) spread spectrum;
xxviii) a single frequency transceiver;
xxix) a dual frequency transceiver;
xxx) INTEL PRO/WIRELESS 5000 LAN;
xxxi) IEEE 802.11;
xxxii) IEEE 802.11A;
xxxiii) IEEE 802.11B; or
xxxiv) IEEE 802.11G.

12. The optical measuring device in accordance with claim 1, wherein said optical measuring device further comprises:
a plurality of interchangeable projection heads interconnect with said plurality of lasers.

13. A method of using an optical measuring device to effectuate measurements, said method comprising the steps of:
a) activating said optical measuring device for operation, said optical measuring device having a plurality of lasers, and a plurality of legs, said optical measuring device having at least three of said plurality of lasers, said plurality of legs are interconnected together, said plurality of lasers are interconnected to certain of said plurality of legs;
b) positioning, by diverging and varying the angle between the laser beams emitted from at least two of said plurality of lasers at user determined reference points;
c) aligning the plurality of lasers based in part on the action of positioning in step 'b' causing said plurality of legs to align the laser beams emitted from said plurality of lasers at such positions that a plurality of measurements can be effectuated; and
d) effectuating said plurality of measurements.

14. The method in accordance with claim 13, wherein activating in step 'a' includes activation by way of at least one of the following:
i) a switch; or
ii) motion of said plurality of legs.

15. The method in accordance with claim 13, wherein said plurality of measurements include measuring at least one of the following:
i) CENTER;
ii) LEVEL;
iii) LENGTH;
iv) DISTANCE; or
v) PLUMB.

16. The method in accordance with claim 13, wherein effectuating said plurality of measurements includes using a distance measurement attachment, said distance measurement attachment is interconnected with said plurality of legs.

17. The method in accordance with claim 13, further comprising at least one of the following the steps:
communicating data between an electronic system and a plurality of data processing resources, said electronic system being interconnected with said optical measuring device;

allowing user interaction with said electronic system; or projecting laser beams in certain patterns by interconnecting a plurality of interchangeable projection heads with said plurality of lasers.

18. An optical measuring device comprising:

a plurality of optical components, said optical measuring device having at least three of said plurality of optical components; and a plurality of legs, said plurality of legs are interconnected together, said plurality of optical components are interconnected to certain of said plurality of legs such that the action of positioning, by diverging and varying the angle between the light beams emitted from at least two of said plurality of optical components at user determined reference points, causes said plurality of legs to align the light beams emitted from said plurality of optical components at positions as to effectuate a plurality of measurements.

19. The optical measuring device in accordance with claim 18, wherein said plurality of measurements include at least one of the following measurements:

i) CENTER;
ii) LEVEL;
iii) LENGTH;
iv) DISTANCE; or
v) PLUMB.

20. The optical measuring device in accordance with claim 18, further comprising at least one of the following:

a plurality of lasers, said plurality of lasers being interconnected with said plurality of optical components, or said plurality of legs;

a distance measurement attachment interconnected with said plurality of legs;

a level interconnected with said plurality of legs, or said plurality of optical components;

a single action alignment leg interconnected with said plurality of legs, wherein the motion of said single action alignment leg moves said plurality of legs and positions said plurality of optical components;

an electronic system attached to said optical measuring device; or a plurality of interchangeable projection heads interconnect with said plurality of optical components, or said plurality of lasers.

* * * * *